(12) United States Patent
Ebe et al.

(10) Patent No.: US 9,097,880 B2
(45) Date of Patent: Aug. 4, 2015

(54) ZOOM LENS AND IMAGE PICKUP APPARATUS HAVING THE SAME

(71) Applicant: CANON KABUSHIKI KAISHA, Tokyo (JP)

(72) Inventors: Hiroki Ebe, Utsunomiya (JP); Yoshihisa Tashiro, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 13/935,111

(22) Filed: Jul. 3, 2013

(65) Prior Publication Data

US 2014/0009841 A1     Jan. 9, 2014

(30) Foreign Application Priority Data

Jul. 9, 2012  (JP) ................. 2012-153686

(51) Int. Cl.
   *G02B 15/14*   (2006.01)
   *G02B 15/16*   (2006.01)
   *G02B 15/177*  (2006.01)
   *H04N 5/225*   (2006.01)

(52) U.S. Cl.
   CPC ............. *G02B 15/14* (2013.01); *G02B 15/16* (2013.01); *G02B 15/177* (2013.01); *H04N 5/2254* (2013.01)

(58) Field of Classification Search
   CPC ........ G02B 15/00; G02B 15/16; G02B 15/14; G02B 15/177; G02B 15/20; G02B 27/646; G02B 13/009; G02B 13/18; G02B 13/04; G02B 13/16; G02B 13/006; G02B 13/0045; G02B 13/0065; G02B 13/12; G02B 23/145; G02B 7/10; G02B 3/14
   USPC ................................... 359/676–690
   See application file for complete search history.

(56) References Cited

U.S. PATENT DOCUMENTS 5,289,317 A * 2/1994 Ikemori et al. ............... 359/689

FOREIGN PATENT DOCUMENTS

| JP | 11072704 A | 3/1999 |
|---|---|---|
| JP | 2006208890 A | 8/2006 |
| JP | 2011059293 A | 3/2011 |

* cited by examiner

*Primary Examiner* — Scott J Sugarman
*Assistant Examiner* — Mitchell Oestreich
(74) *Attorney, Agent, or Firm* — Canon USA Inc. IP Division

(57) ABSTRACT

A zoom lens consists of, in order from an object side to an image side, a first lens unit having negative refractive power, a second lens unit having positive refractive power, and a third lens unit having negative refractive power. The first lens unit and the second lens unit move during zooming to make a distance between the first lens unit and the second lens unit larger at a telephoto end than at a wide-angle end. The third lens unit consists of, in order from the object side to the image side, a first lens subunit having positive refractive power and a second lens subunit having negative refractive power, and the second lens subunit moves toward the image side during focusing from an infinite-distance object to a near-distance object.

9 Claims, 37 Drawing Sheets

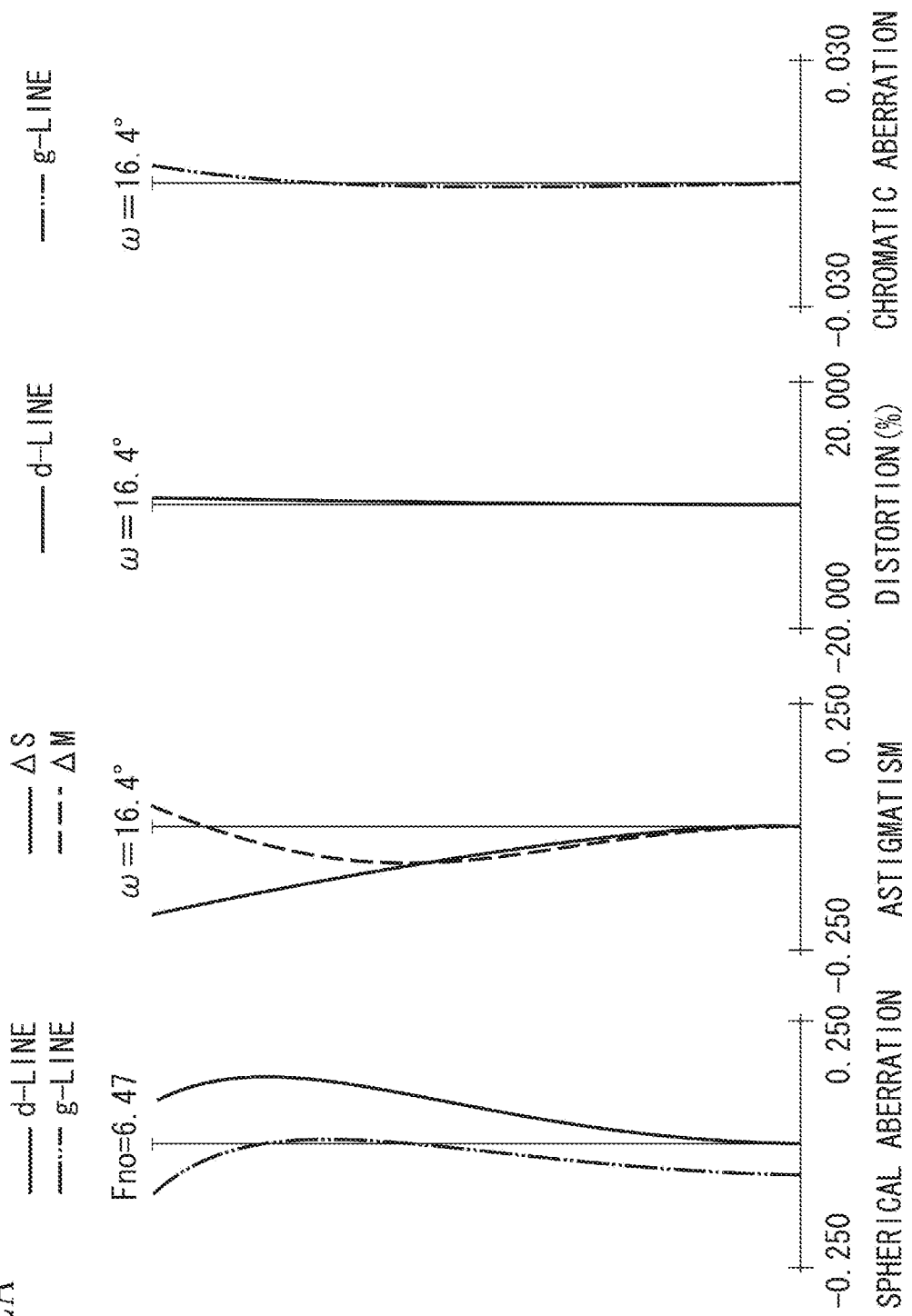

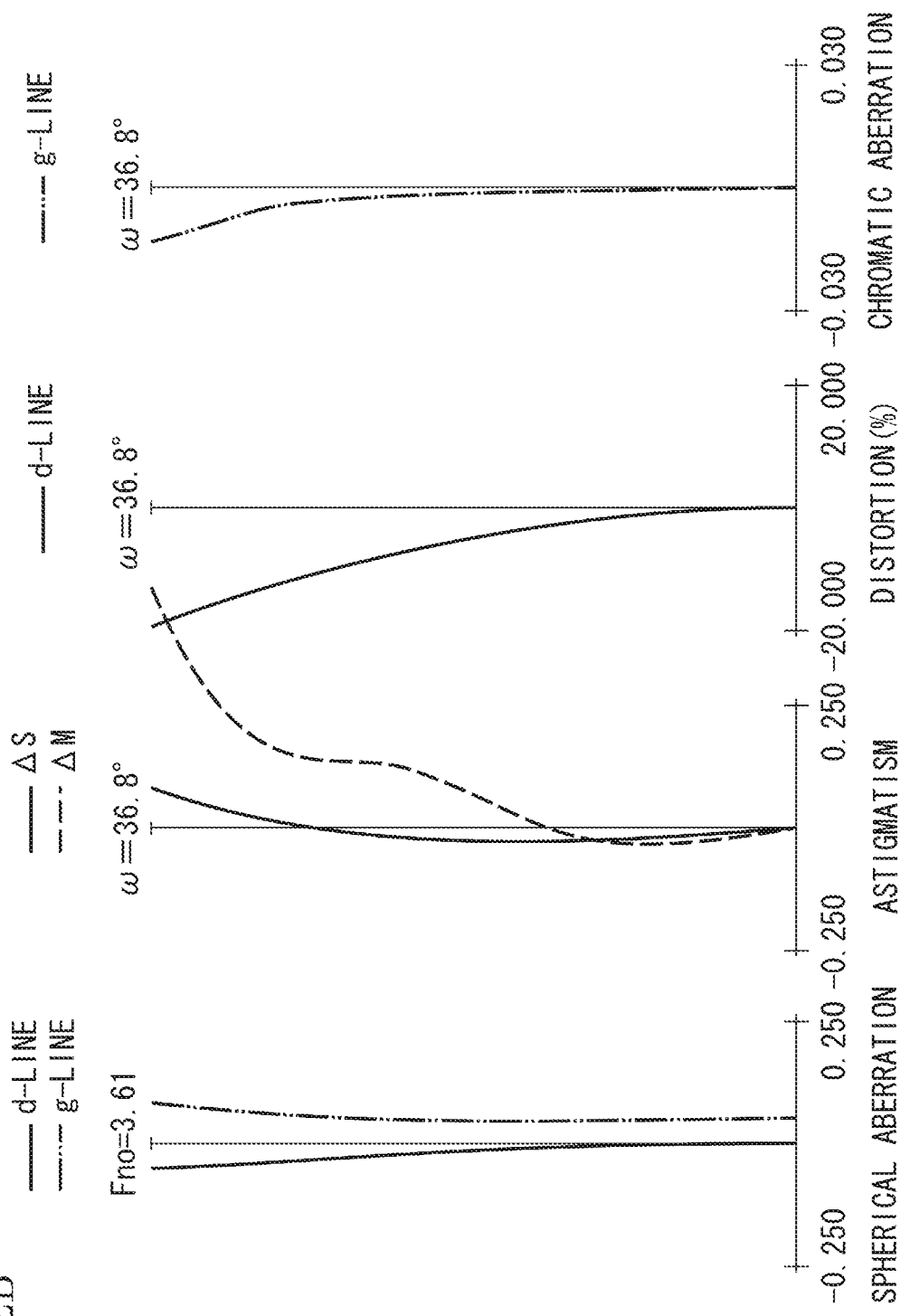

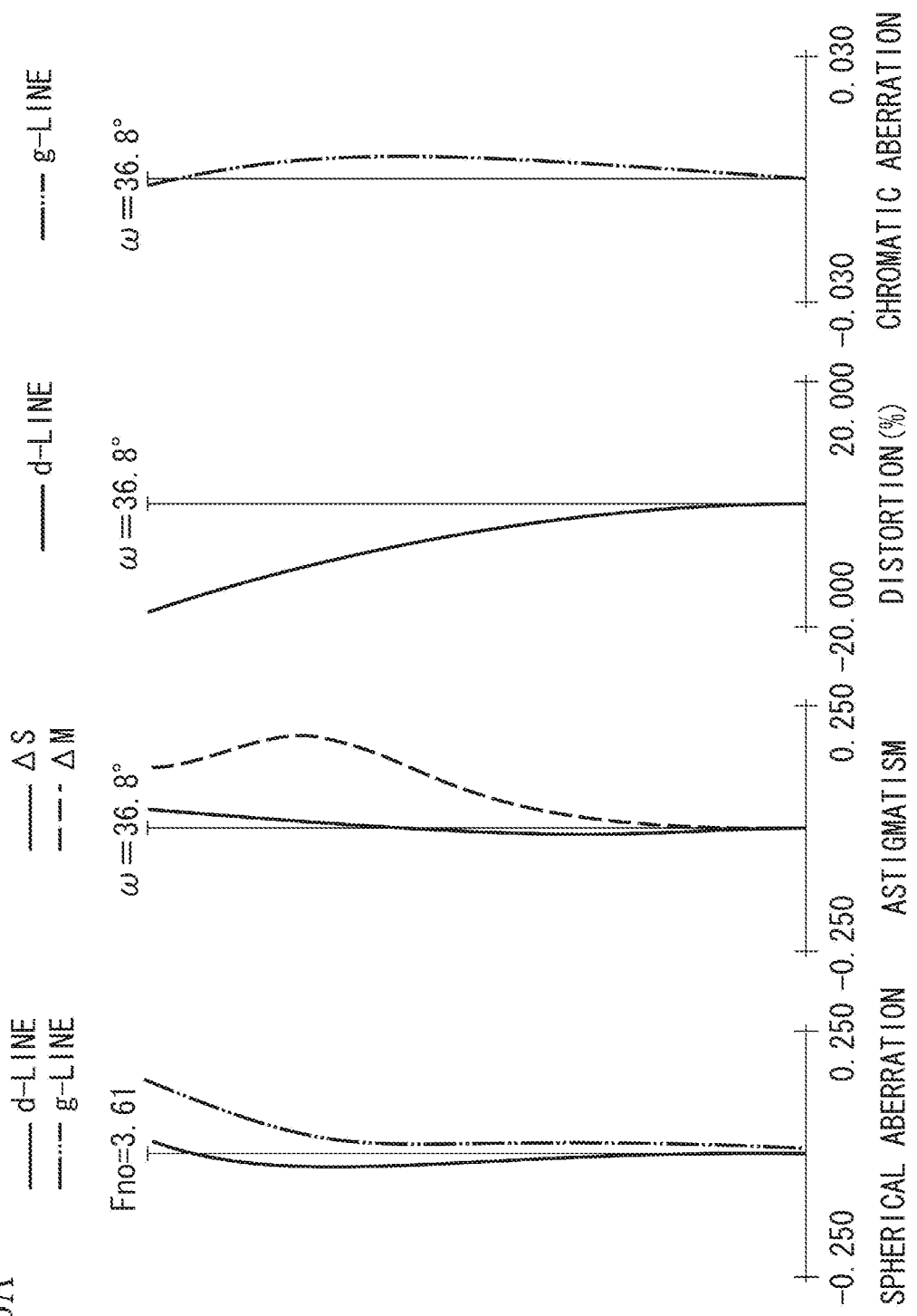

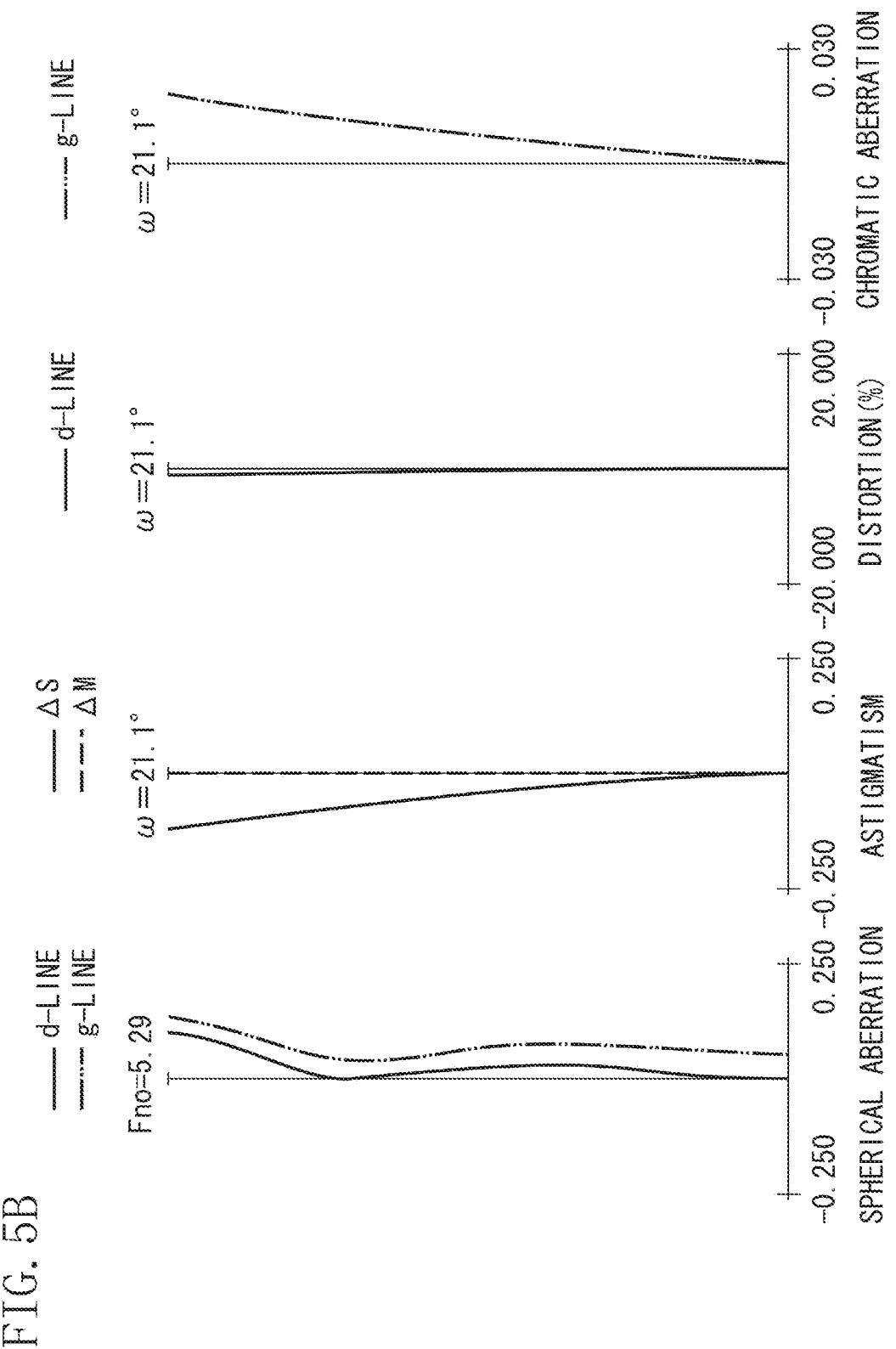

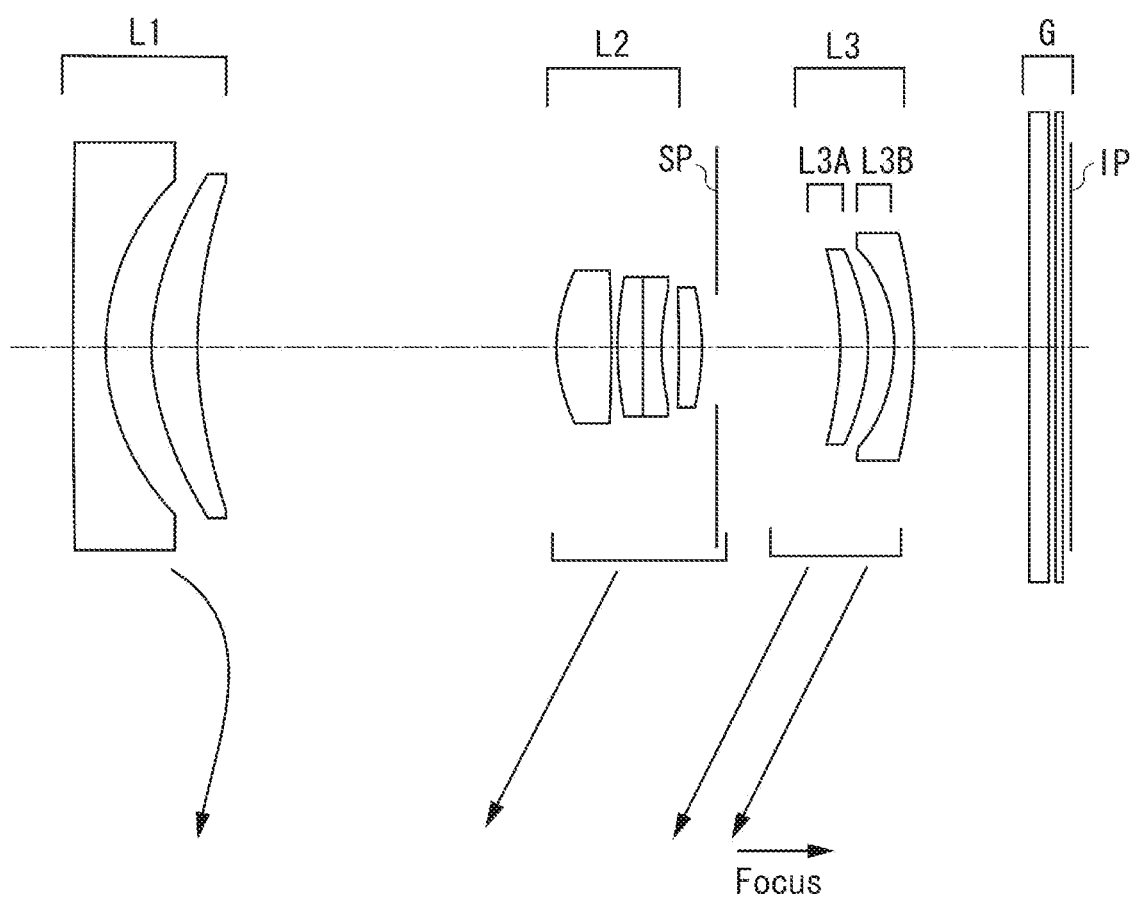

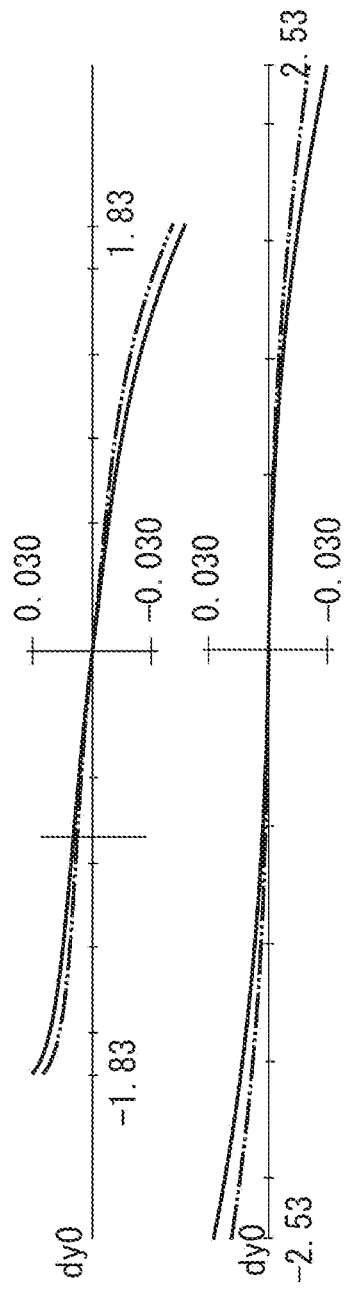

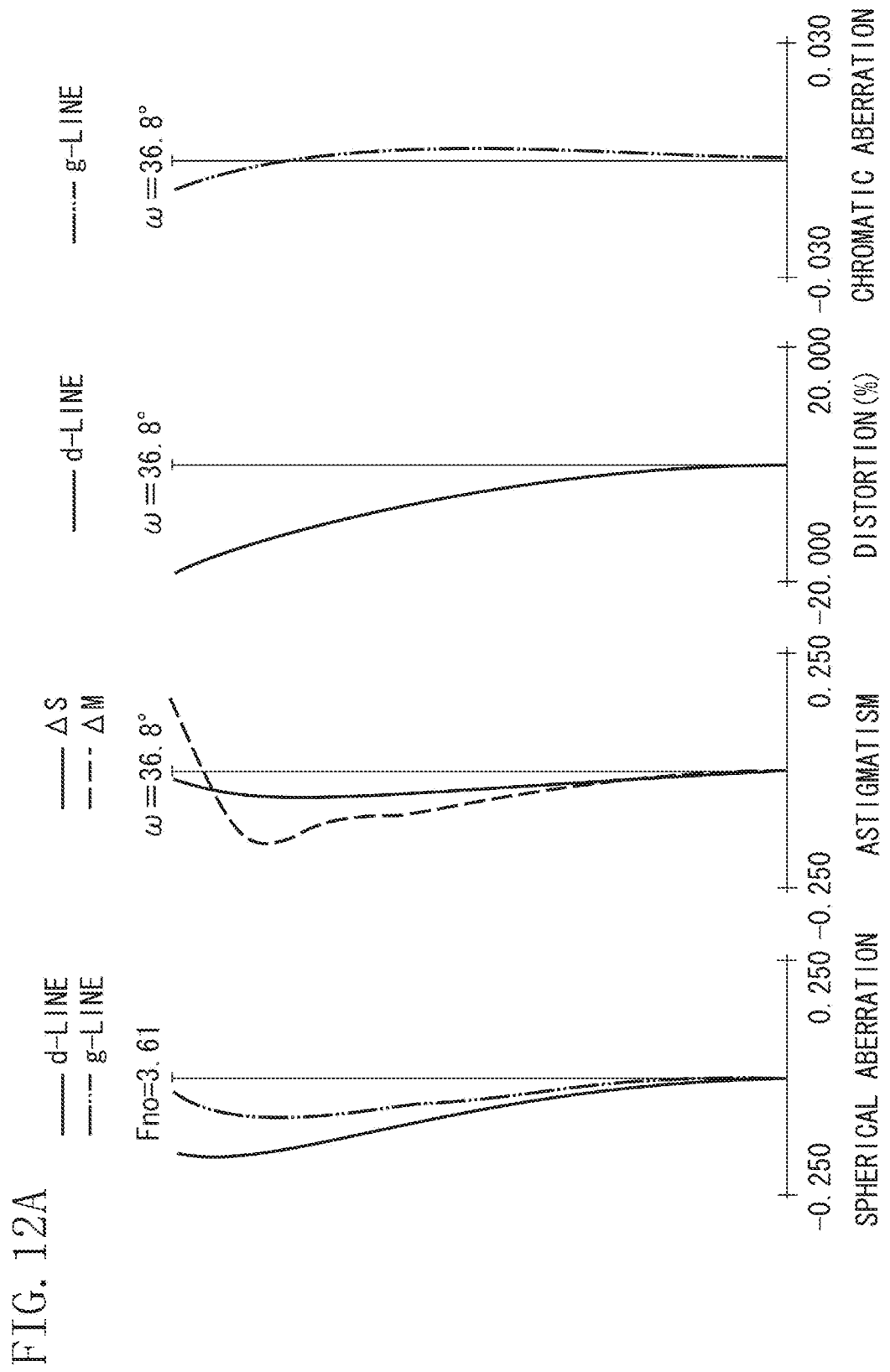

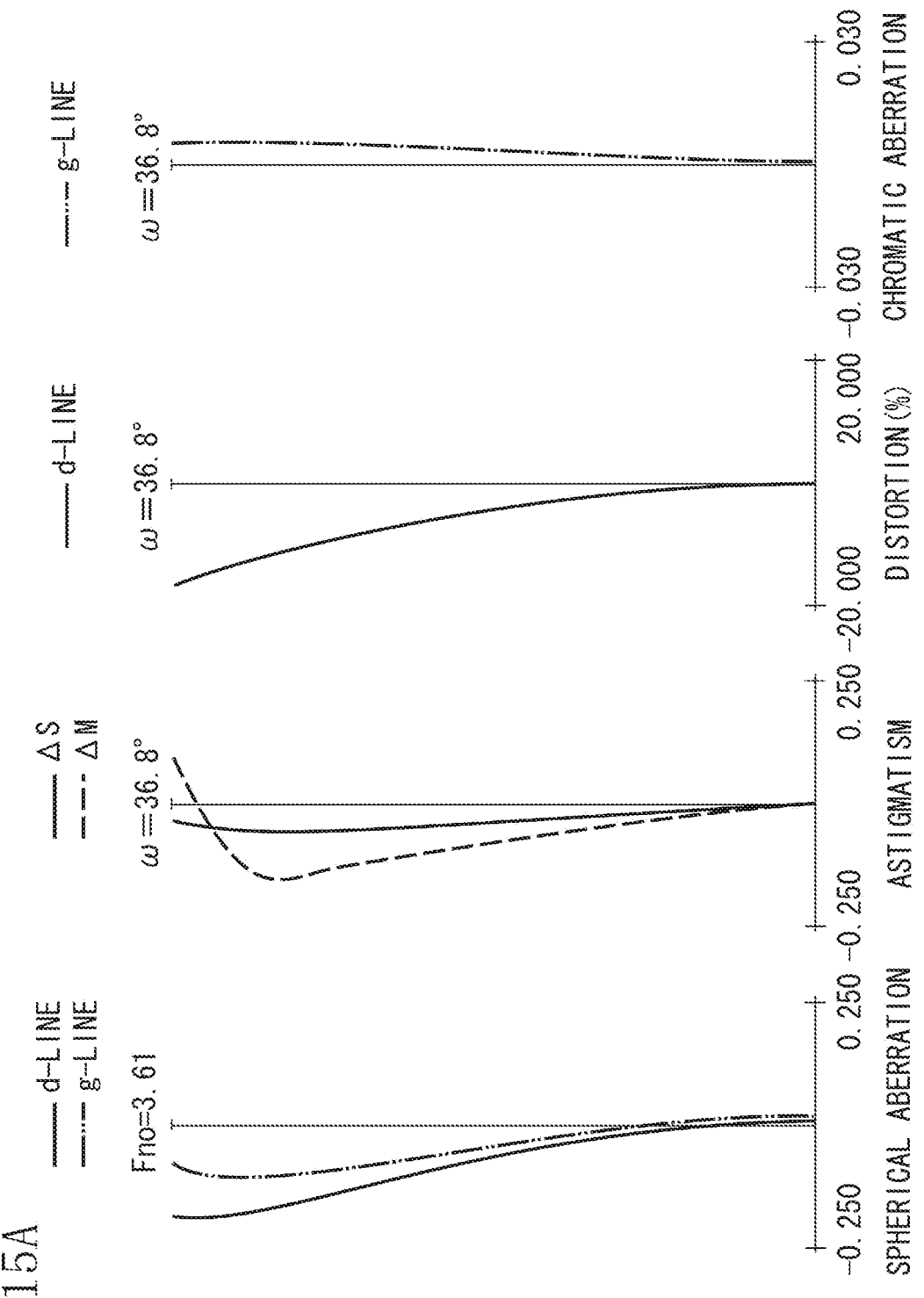

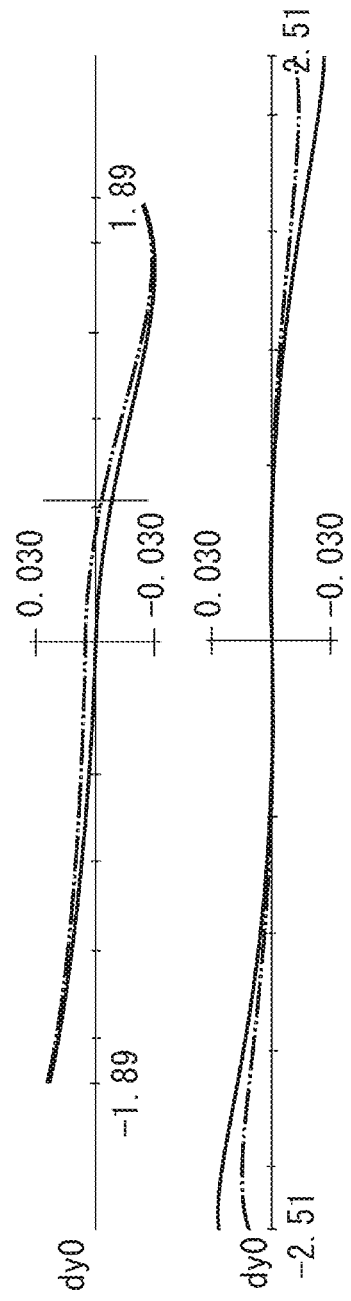

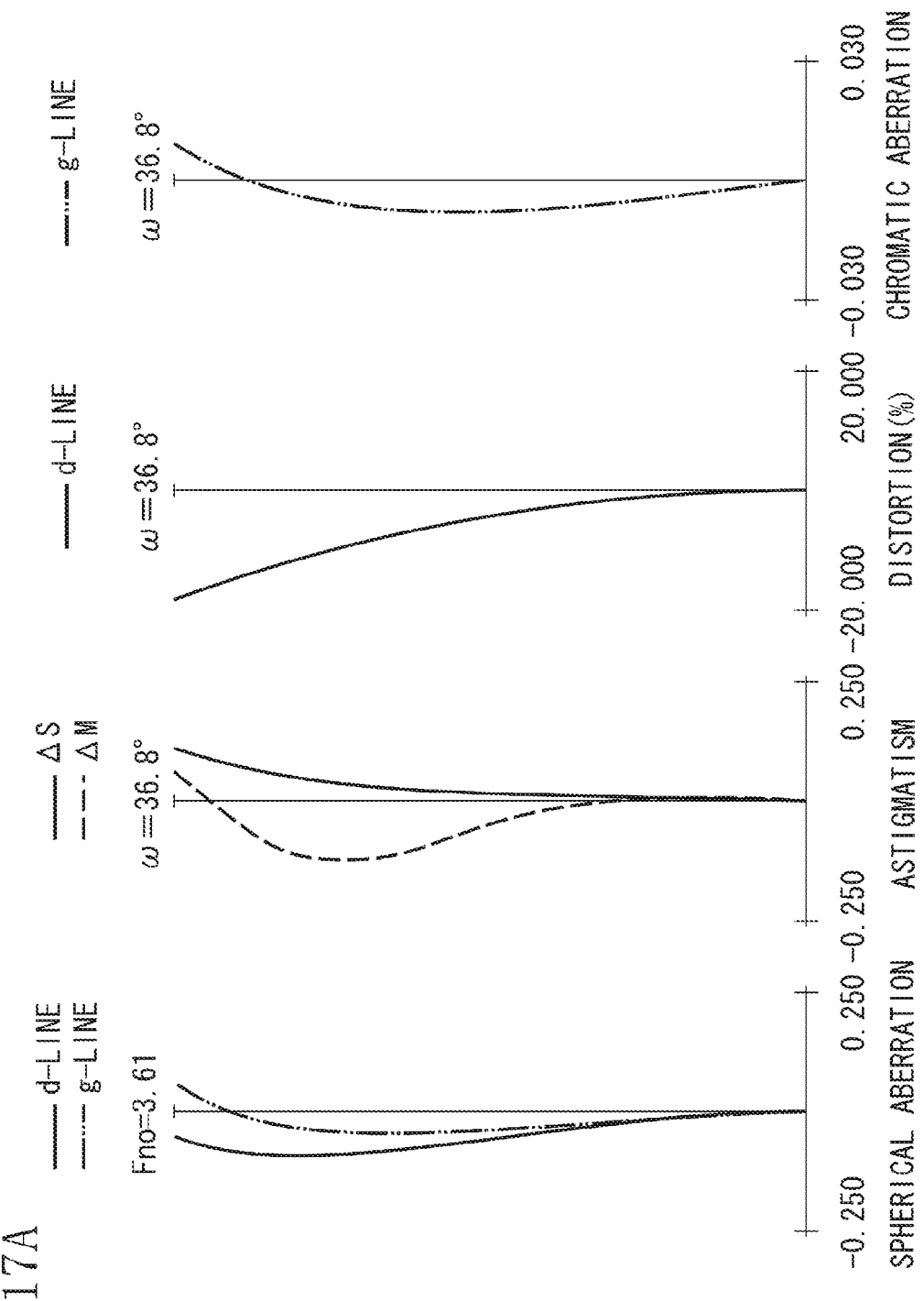

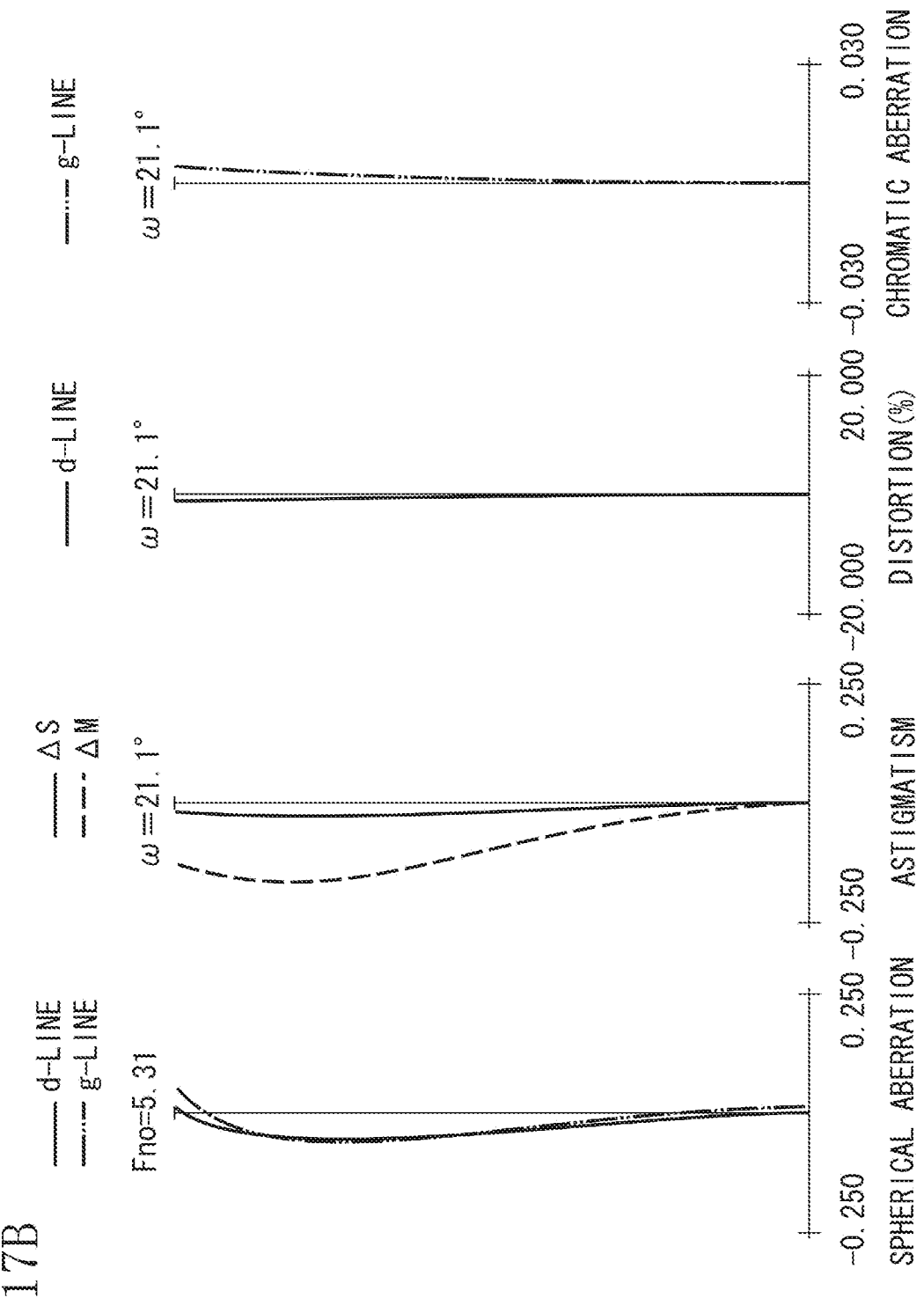

ZOOM LENS AND IMAGE PICKUP APPARATUS HAVING THE SAME

BACKGROUND OF THE INVENTION

1. Field of the Invention

The present invention relates to a zoom lens, and relates to a zoom lens suitable for an image pickup apparatus, such as a video camera, a digital still camera, a television camera, and a monitoring camera.

2. Description of the Related Art

It is necessary for zoom lenses used in image pickup apparatuses to have a wide angle of view, fast focusing capability, and a shallow depth of field for creating a soft focus effect to cause a main object to standout clearly against the background. On the other hand, it is necessary for image pickup apparatuses using image sensors to have sufficient image-side telecentricity to eliminate shading effects.

Downsizing of the image sensors makes it easier to realize the sufficient telecentricity of the zoom lens and downsizing of the image pickup apparatus at the same time, but it results in shorter focal lengths, and accordingly, deeper depths of field. If the image sensor is made larger with the telecentricity of the zoom lens kept sufficient, the entire zoom lens would be larger.

As a wide-angle zoom lens, a negative lead type zoom lens, in which a lens unit having negative refractive power is arranged nearest to the object side, is known.

Japanese Patent Application Laid-Open No. 11-72704 discusses a zoom lens which includes, in order from an object side to an image side, a first lens unit having negative refractive power, a second lens unit having positive refractive power, a third lens unit having positive refractive power, and a fourth lens unit having negative refractive power. In this zoom lens, each lens unit moves during zooming, and the first lens unit moves during focusing. Since the large and heavy first lens unit moves during focusing, it is difficult for the zoom lens to perform fast focusing.

Japanese Patent Application Laid-Open No. 2011-59293 discusses a zoom lens which includes, in order from an object side to an image side, a first lens unit having negative refractive power, a second lens unit having positive refractive power, and a third lens unit having negative refractive power. In this zoom lens, each lens unit moves during zooming. Japanese Patent Application Laid-Open No. 2011-59293 also discusses a configuration of dividing the third lens unit into a lens subunit 3a having negative refractive power and a lens subunit 3b having positive refractive power to move the lens subunit 3b during focusing.

Since this zoom lens has the third lens unit divided into the lens subunit 3a having negative refractive power and the lens subunit 3b having positive refractive power in order from the object side to the image side to ensure the telecentricity, the total optical system length and the effective diameter of the final lens tend to be larger. Further, since the zoom lens is configured on the assumption that negative distortion is to be corrected by image processing and has the lenses configured to allow optical distortion to be corrected, the zoom lens has relatively large fluctuation in curvature of field associated with focusing.

Japanese Patent Application Laid-Open No. 2006-208890 discusses a zoom lens which includes, in order from an object side to an image side, a first lens unit having negative refractive power, a second lens unit having positive refractive power, and a third lens unit having positive refractive power. In this zoom lens, each lens unit moves during zooming, and the third lens unit moves during focusing.

It is necessary for zoom lenses used in image pickup apparatuses to provide compactness of the entire zoom lens, a wide angle of view, easiness of fast focusing, and high optical performance over the entire object distance. To meet these requirements, it is important to appropriately set the lens configuration and refractive power of each lens unit.

SUMMARY OF THE INVENTION

The present invention is directed to a zoom lens which provides compactness of the entire zoom lens, a wide angle of view, and easiness of fast focusing, and is also directed to an image pickup apparatus including the zoom lens.

According to an aspect of the present invention, a zoom lens consists of, in order from an object side to an image side, a first lens unit having negative refractive power, a second lens unit having positive refractive power, and a third lens unit having negative refractive power. The first lens unit and the second lens unit move during zooming to make a distance between the first lens unit and the second lens unit larger at a telephoto end than at a wide-angle end. The third lens unit consists of, in order from the object side to the image side, a first lens subunit having positive refractive power and a second lens subunit having negative refractive power, and the second lens subunit moves toward the image side during focusing from an infinite-distance object to a near-distance object.

Further features of the present invention will become apparent from the following detailed description of exemplary embodiments with reference to the attached drawings.

BRIEF DESCRIPTION OF THE DRAWINGS

FIGS. 2A, 2B, and 2C are longitudinal aberration diagrams at the wide-angle end, a middle zoom position, and a telephoto end, respectively, when the zoom lens according to the first exemplary embodiment focuses on an infinite-distance object.

FIGS. 5A, 5B, and 5C are longitudinal aberration diagrams at the wide-angle end, the middle zoom position, and the telephoto end, respectively, when the zoom lens according to the second exemplary embodiment focuses on an infinite-distance object.

FIG. 7 is a lens cross-sectional view at a wide-angle end of a zoom lens according to a third exemplary embodiment of the present invention.

FIGS. 9A and 9B are respectively a longitudinal aberration diagram at the wide-angle end when the zoom lens focuses on a closest range object according to the third exemplary embodiment, and a lateral aberration diagram at the wide-angle end when the zoom lens focuses on the closest range object at the axial point (Y=0) and at the point of 70% (Y=0.7 Ymax) of an image height.

FIGS. 12A and 12B are respectively a longitudinal aberration diagram at the wide-angle end when the zoom lens focuses on a closest range object according to the fourth exemplary embodiment, and a lateral aberration diagram at the wide-angle end when the zoom lens focuses on the closest range object at the axial point (Y=0) and at the point of 70% (Y=0.7 Ymax) of an image height.

FIGS. 15A and 15B are respectively a longitudinal aberration diagram at the wide-angle end when the zoom lens focuses on a closest range object according to the fifth exemplary embodiment, and a lateral aberration diagram at the wide-angle end when the zoom lens focuses on the closest range object at the axial point (Y=0) and at the point of 70% (Y=0.7 Ymax) of an image height.

FIGS. 17A, 17B, and 17C are longitudinal aberration diagrams at the wide-angle end, the middle zoom position, and the telephoto end, respectively, when the zoom lens according to the sixth exemplary embodiment focuses on an infinite-distance object.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from an object side to an image side, a first lens unit having negative refractive power, a second lens unit having positive refractive power, and a third lens unit having negative refractive power. The third lens unit includes, in order from the object side to the image side, a lens subunit L3A having positive refractive power and a lens subunit L3B having negative refractive power. The first lens unit and the second lens unit move during zooming so that a distance between the first lens unit and the second lens unit becomes larger at a telephoto end than at a wide-angle end.

The lens subunit L3B moves toward the image side during focusing from an infinite-distance object to a near-distance object. In the description of the lens configuration below, it is assumed that a lens having at least one cemented portion is counted as one cemented lens. Also, an element which is cemented to a lens by a resin formed on the lens surface is counted as one cemented lens.

Figure 1:
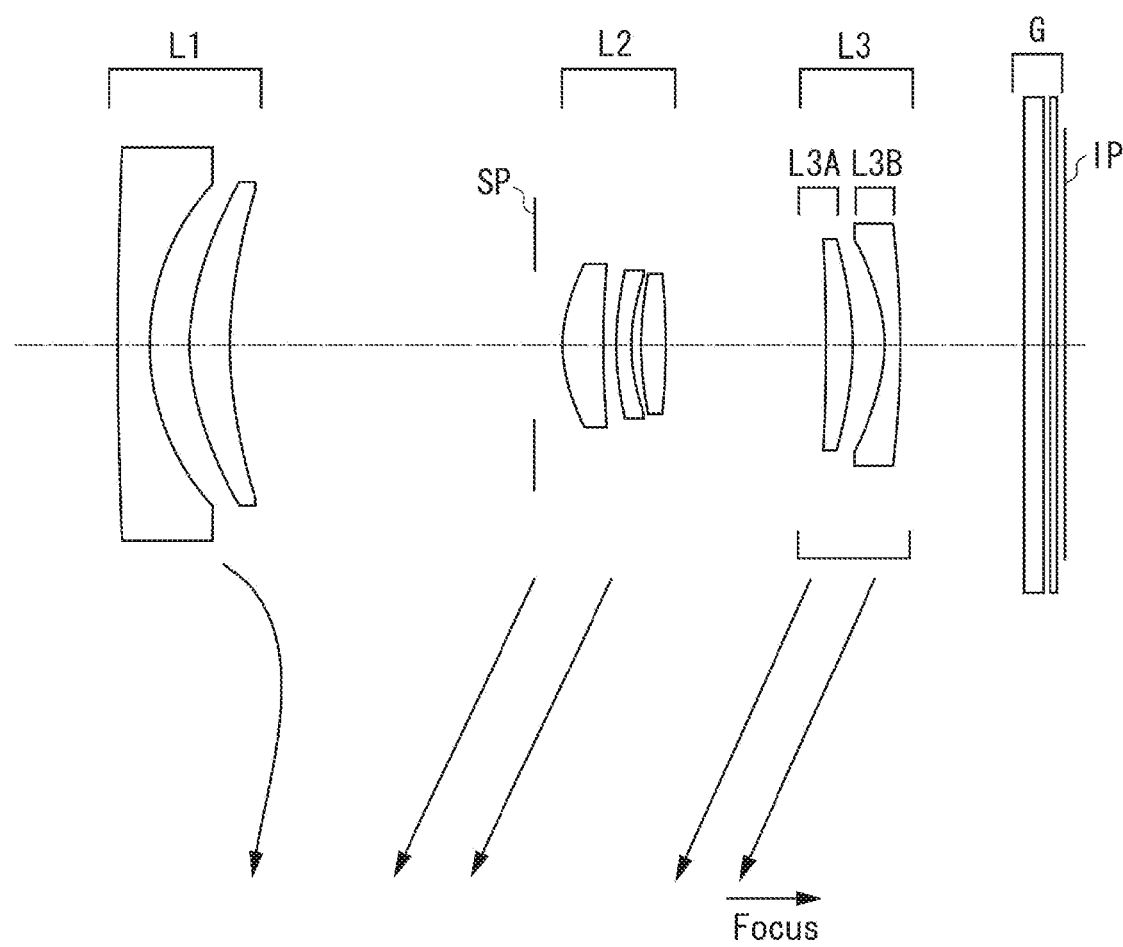
FIG. 1 is a lens cross-sectional view at a wide-angle end of a zoom lens according to a first exemplary embodiment of the present invention.
Figure 2C:
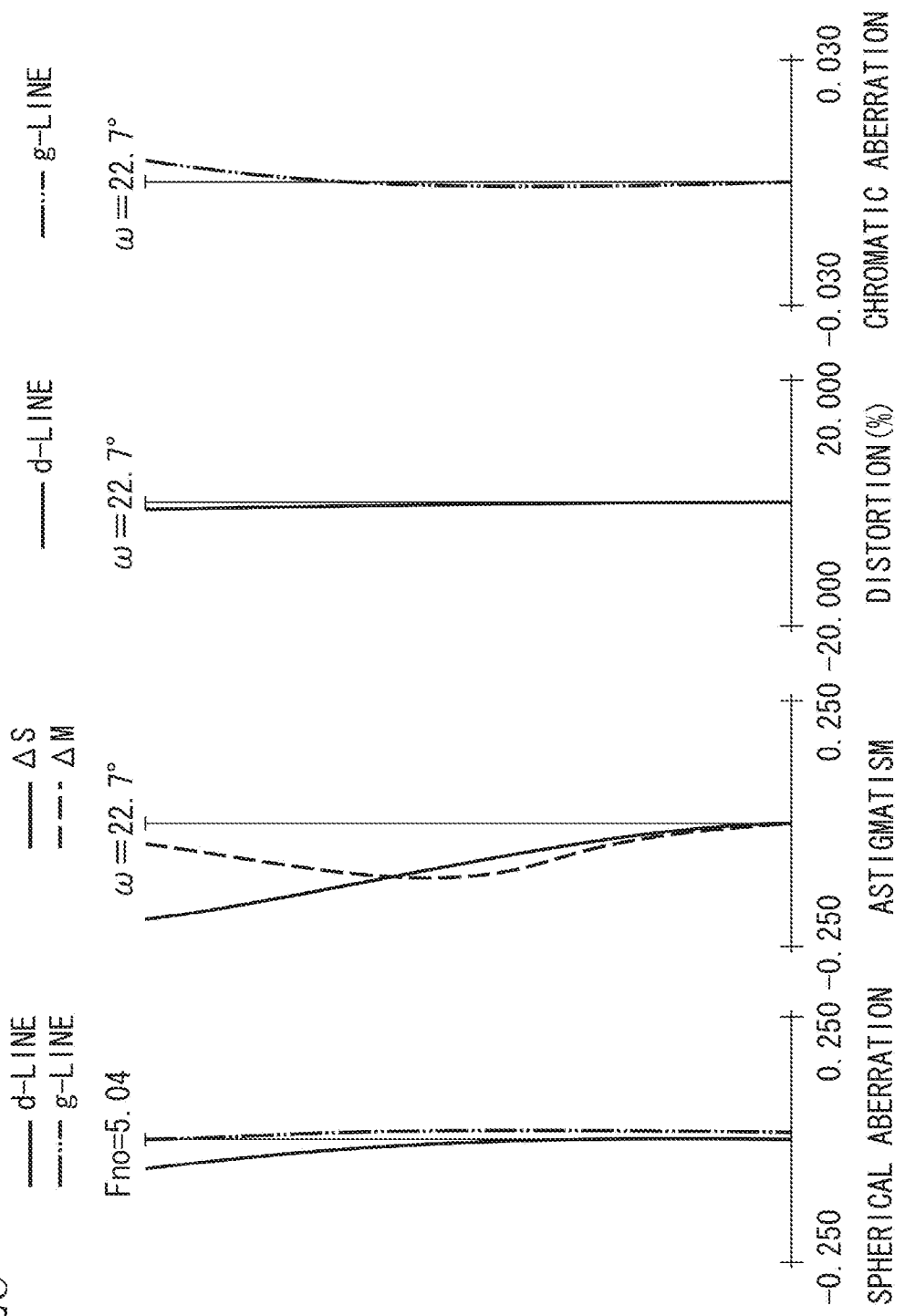
Figure 3A:
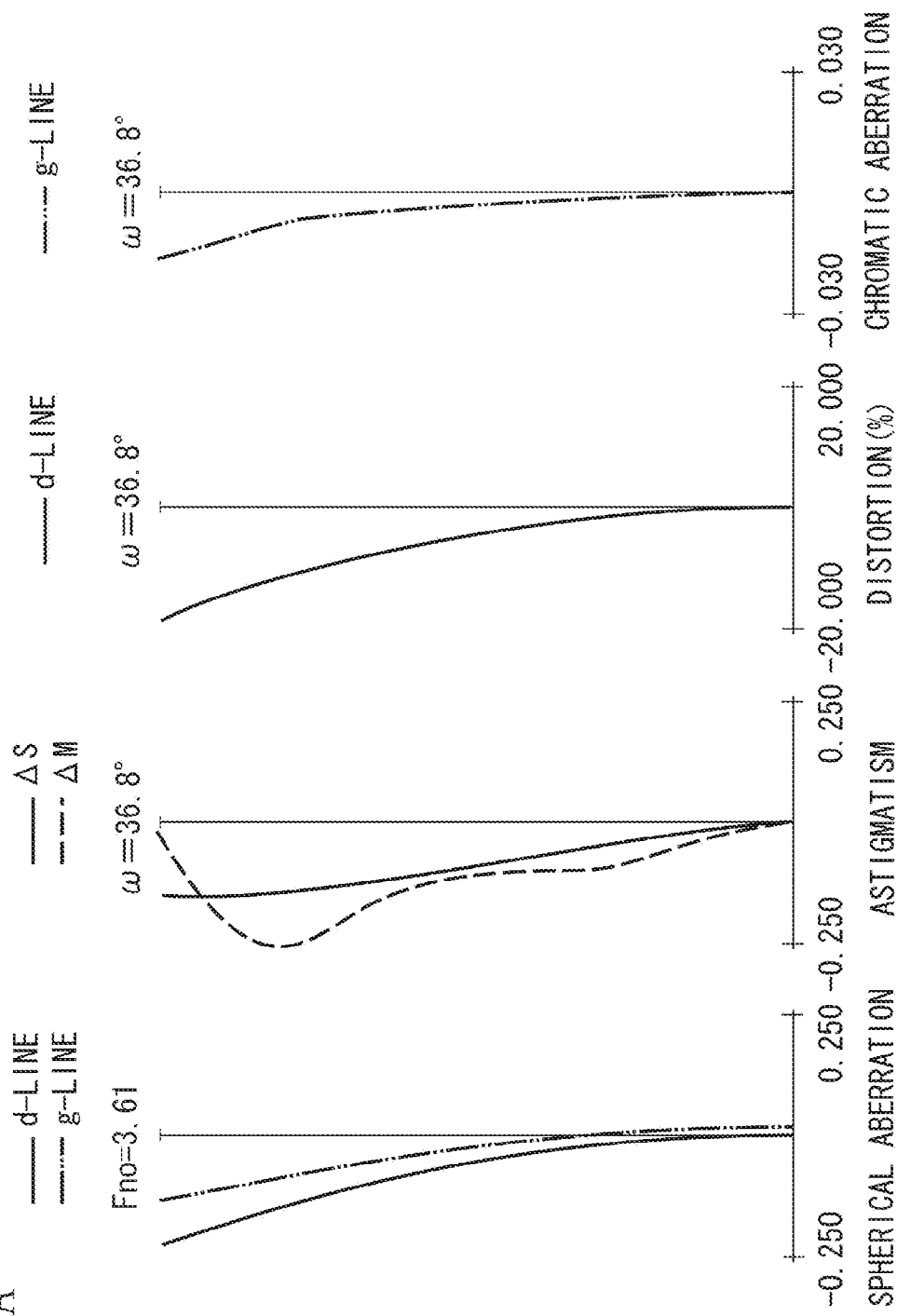
FIGS. 3A and 3B are respectively a longitudinal aberration diagram at the wide-angle end when the zoom lens focuses on a closest range object according to the first exemplary embodiment, and a lateral aberration diagram at the wide-angle end when the zoom lens focuses on the closest range object at the axial point (Y=0) and at the point of 70% (Y=0.7 Ymax) of an image height.
Figure 3B:
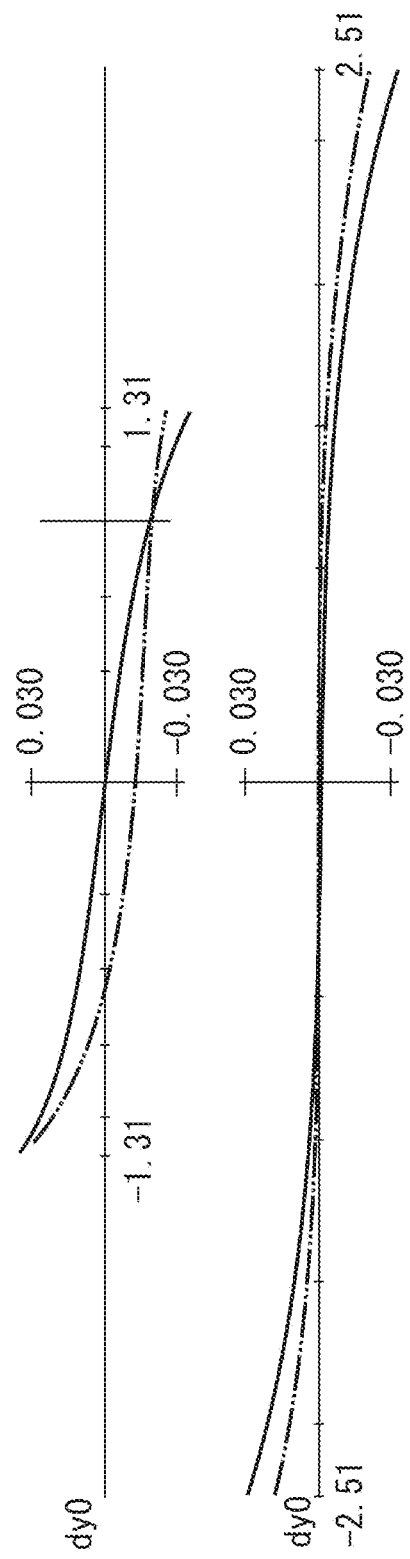

FIG. 1 is a lens cross-sectional view at a wide-angle end (short focal length end) of the zoom lens according to the first exemplary embodiment of the present invention. FIGS. 2A, 2B, and 2C are longitudinal aberration diagrams at the wide-angle end, the middle zoom position, and the telephoto end (long focal length end), respectively, when the zoom lens according to the first exemplary embodiment focuses on an infinite-distance object. FIG. 3A is a longitudinal aberration diagram at the wide-angle end when the zoom lens focuses on a closest range object. FIG. 3B is a lateral aberration diagram at the wide-angle end when the zoom lens focuses on a closest range object at the axial point (Y=0) and at the point of 70% (Y=0.7 Ymax) of an image height. Here, Ymax represents the maximum image height.

Figure 4:
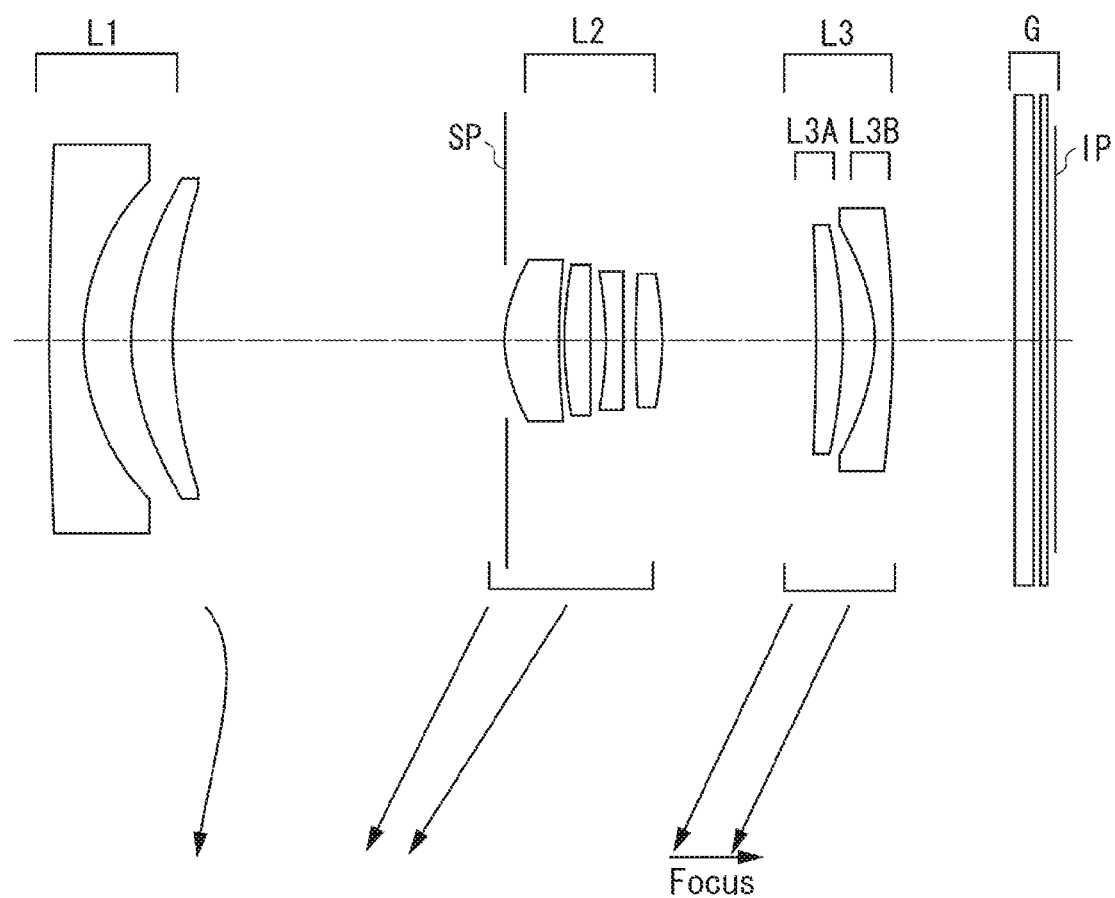
FIG. 4 is a lens cross-sectional view at a wide-angle end of a zoom lens according to a second exemplary embodiment of the present invention.
Figure 5C:
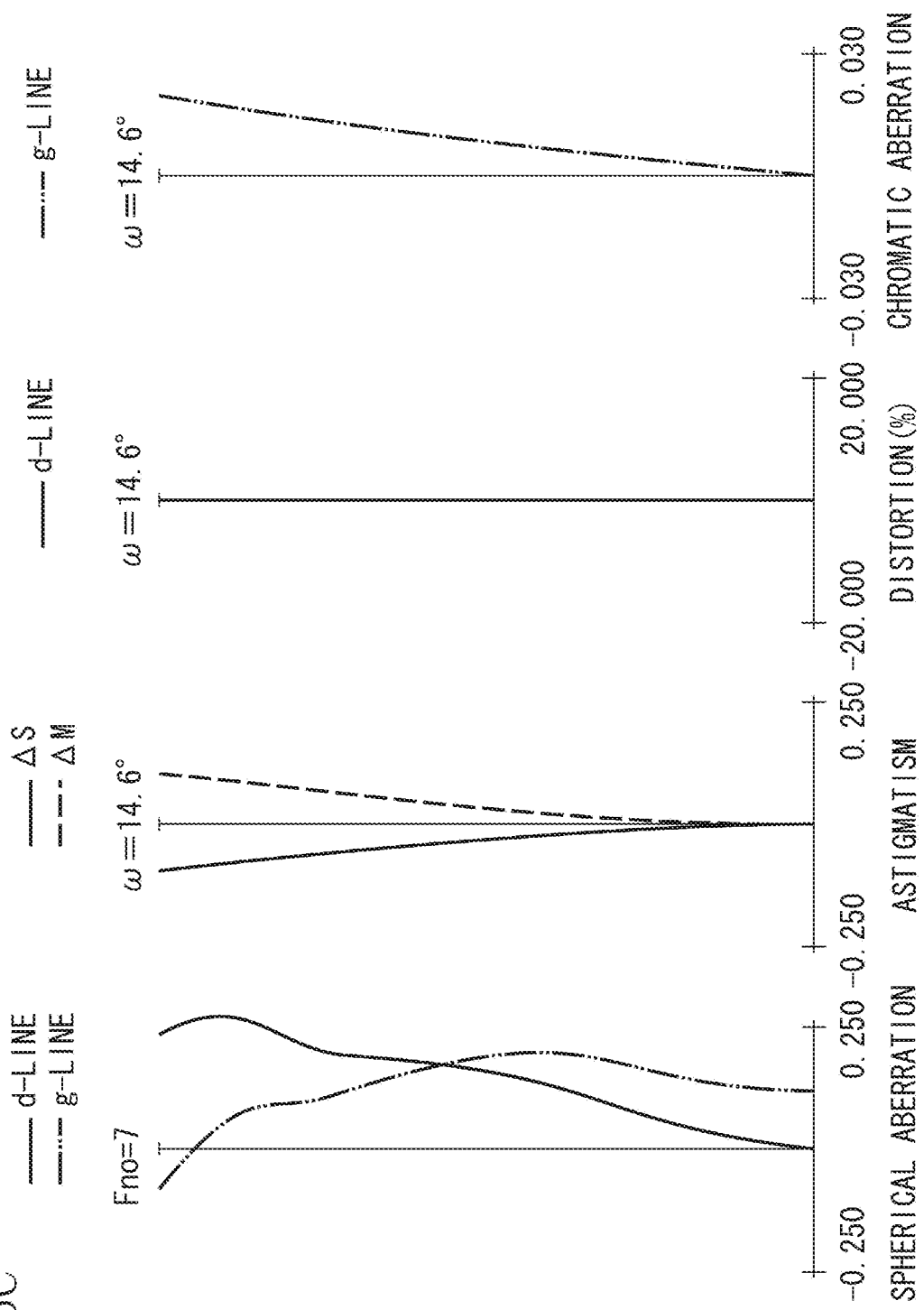
Figure 6A:
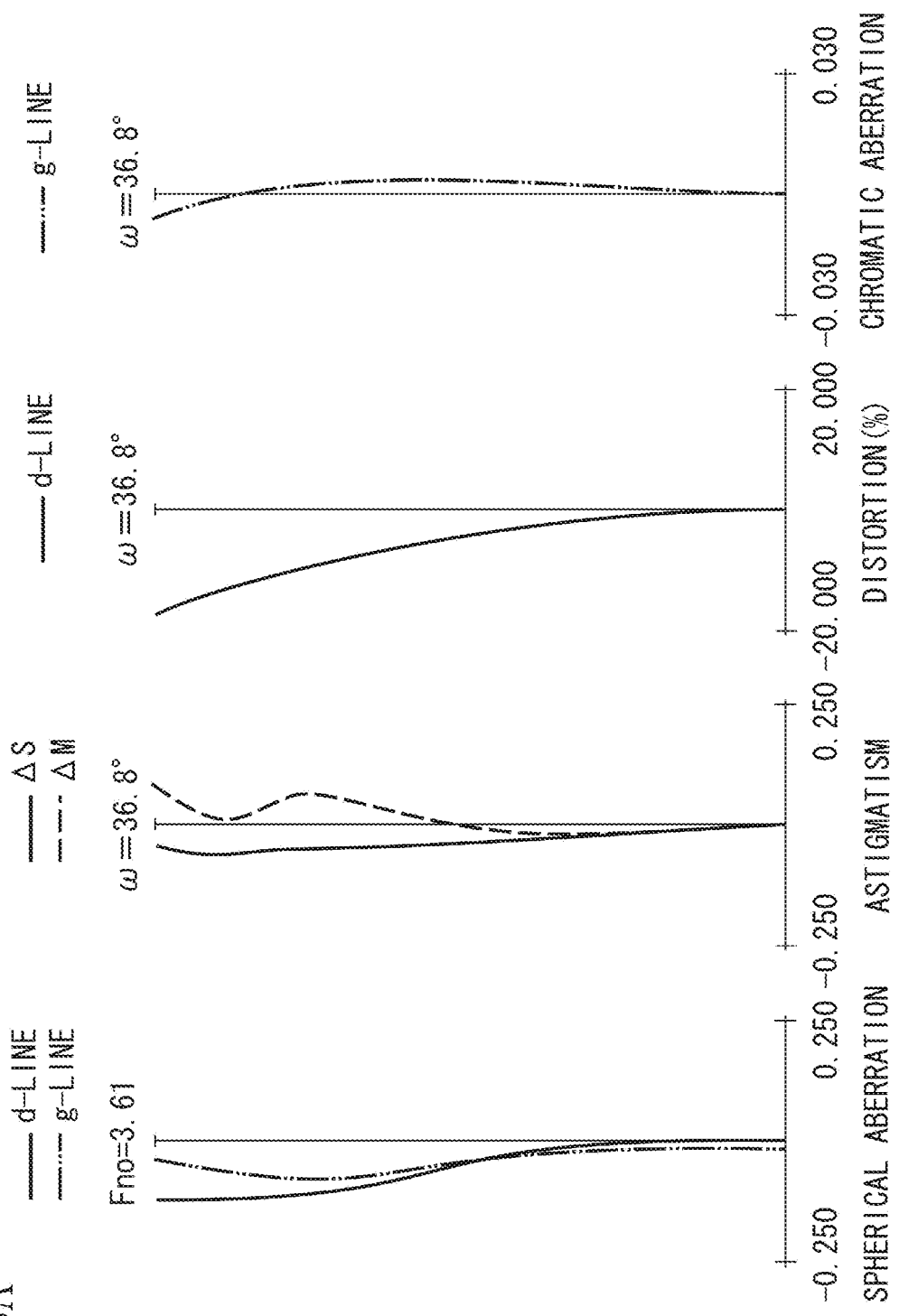
FIGS. 6A and 6B are respectively a longitudinal aberration diagram at the wide-angle end when the zoom lens focuses on a closest range object according to the second exemplary embodiment, and a lateral aberration diagram at the wide-angle end when the zoom lens focuses on the closest range object at the axial point (Y=0) and at the point of 70% (Y=0.7 Ymax) of an image height.
Figure 6B:
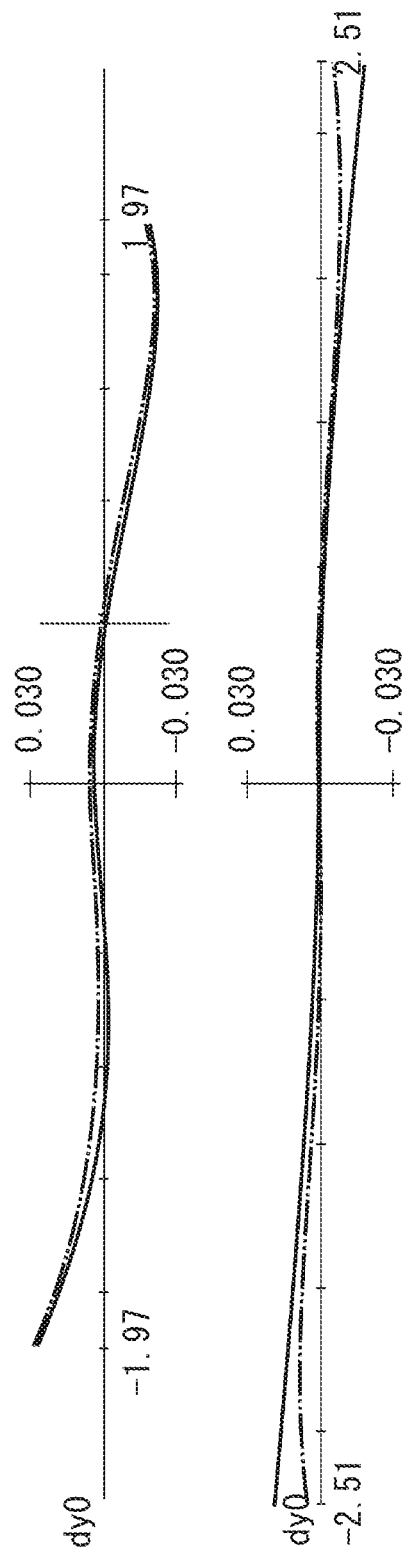

FIG. 4 is a lens cross-sectional view at a wide-angle end of a zoom lens according to a second exemplary embodiment of the present invention. FIGS. 5A, 5B, and 5C are longitudinal aberration diagrams at the wide-angle end, the middle zoom position, and the telephoto end, respectively, when the zoom lens according to the second exemplary embodiment focuses on an infinite-distance object. FIG. 6A is a longitudinal aberration diagram at the wide-angle end when the zoom lens focuses on a closest range object. FIG. 6B is a lateral aberration diagram at the wide-angle end when the zoom lens focuses on a closest range object at the axial point (Y=0) and at the point of 70% (Y=0.7 Ymax) of an image height.

Figure 8A:
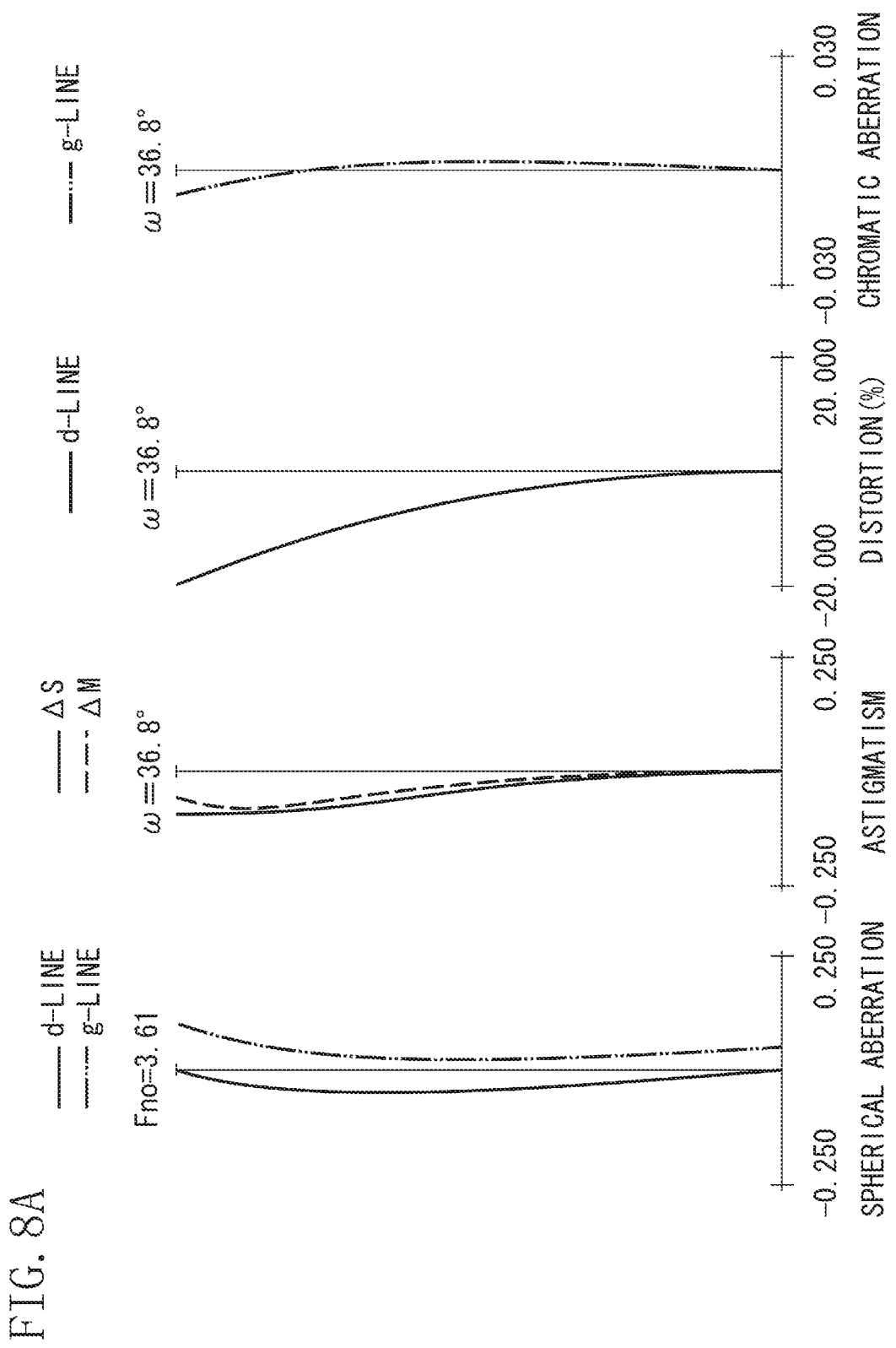
FIGS. 8A, 8B, and 8C are longitudinal aberration diagrams at the wide-angle end, the middle zoom position, and the telephoto end, respectively, when the zoom lens according to the third exemplary embodiment focuses on an infinite-distance object.
Figure 8B:
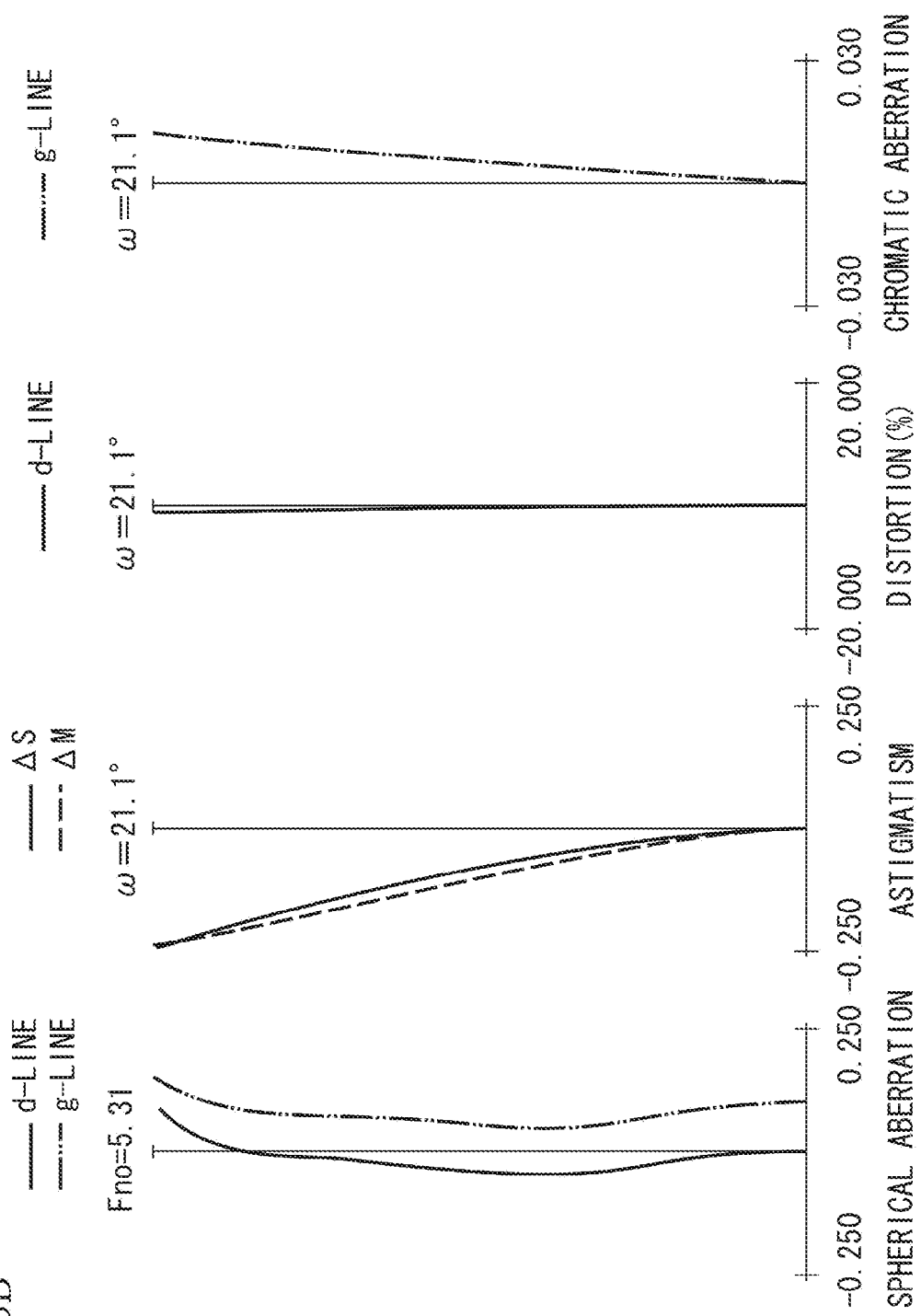
Figure 8C:
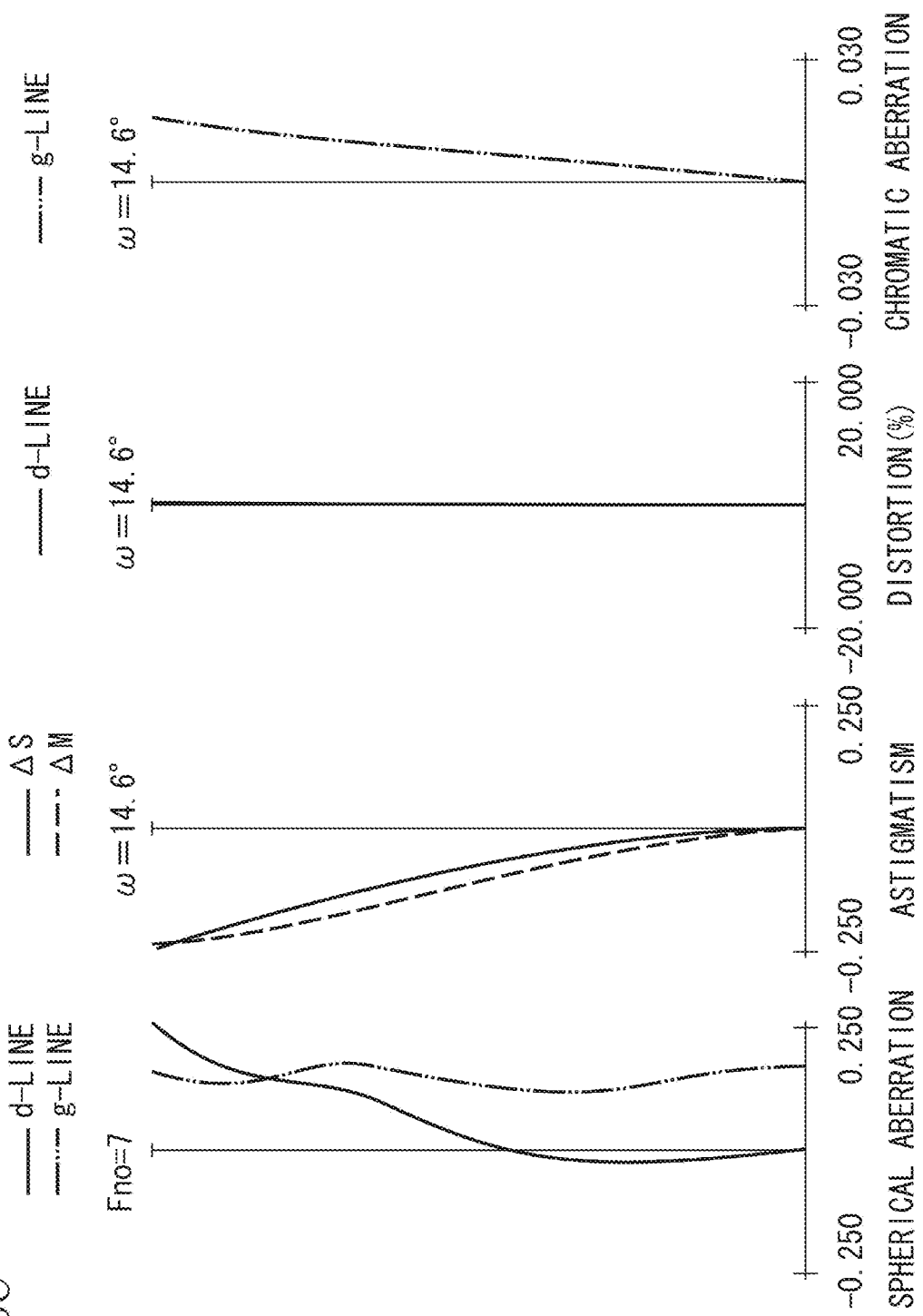
Figure 9A:
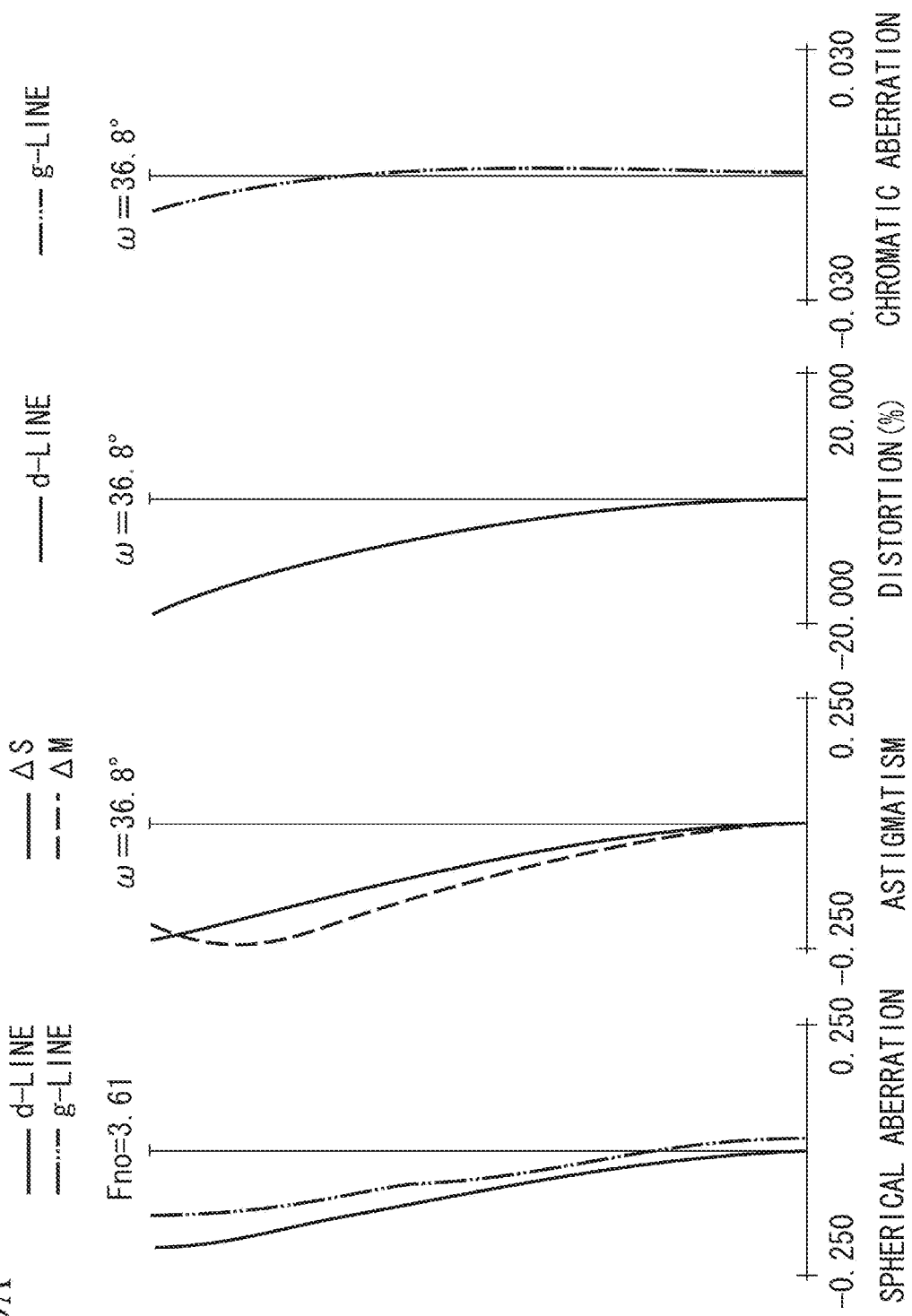

FIG. 7 is a lens cross-sectional view at a wide-angle end of a zoom lens according to a third exemplary embodiment of the present invention. FIGS. 8A, 8B, and 8C are longitudinal aberration diagrams at the wide-angle end, the middle zoom position, and the telephoto end, respectively, when the zoom lens according to the third exemplary embodiment focuses on an infinite-distance object. FIG. 9A is a longitudinal aberration diagram at the wide-angle end when the zoom lens focuses on a closest range object. FIG. 9B is a lateral aberration diagram at the wide-angle end when the zoom lens focuses on a closest range object at the axial point (Y=0) and at the point of 70% (Y=0.7 Ymax) of an image height.

Figure 10:
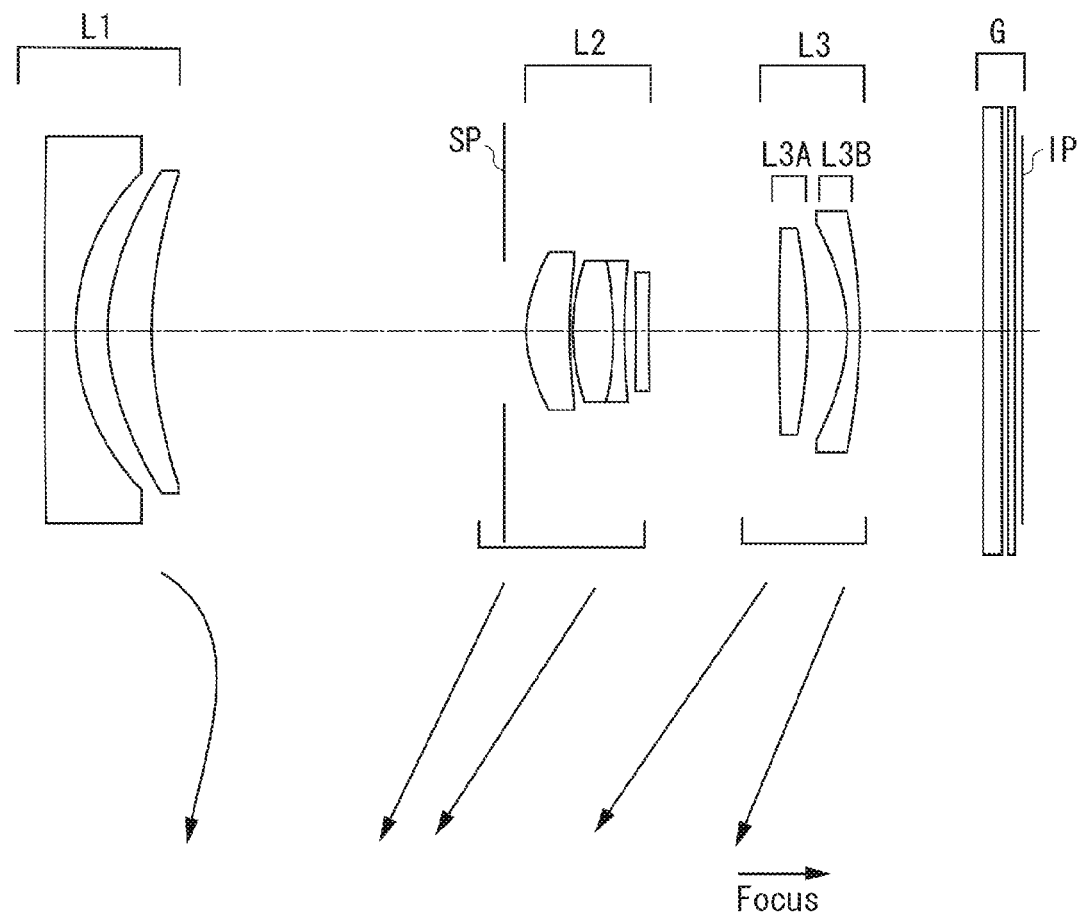
FIG. 10 is a lens cross-sectional view at a wide-angle end of a zoom lens according to a fourth exemplary embodiment of the present invention.
Figure 11A:
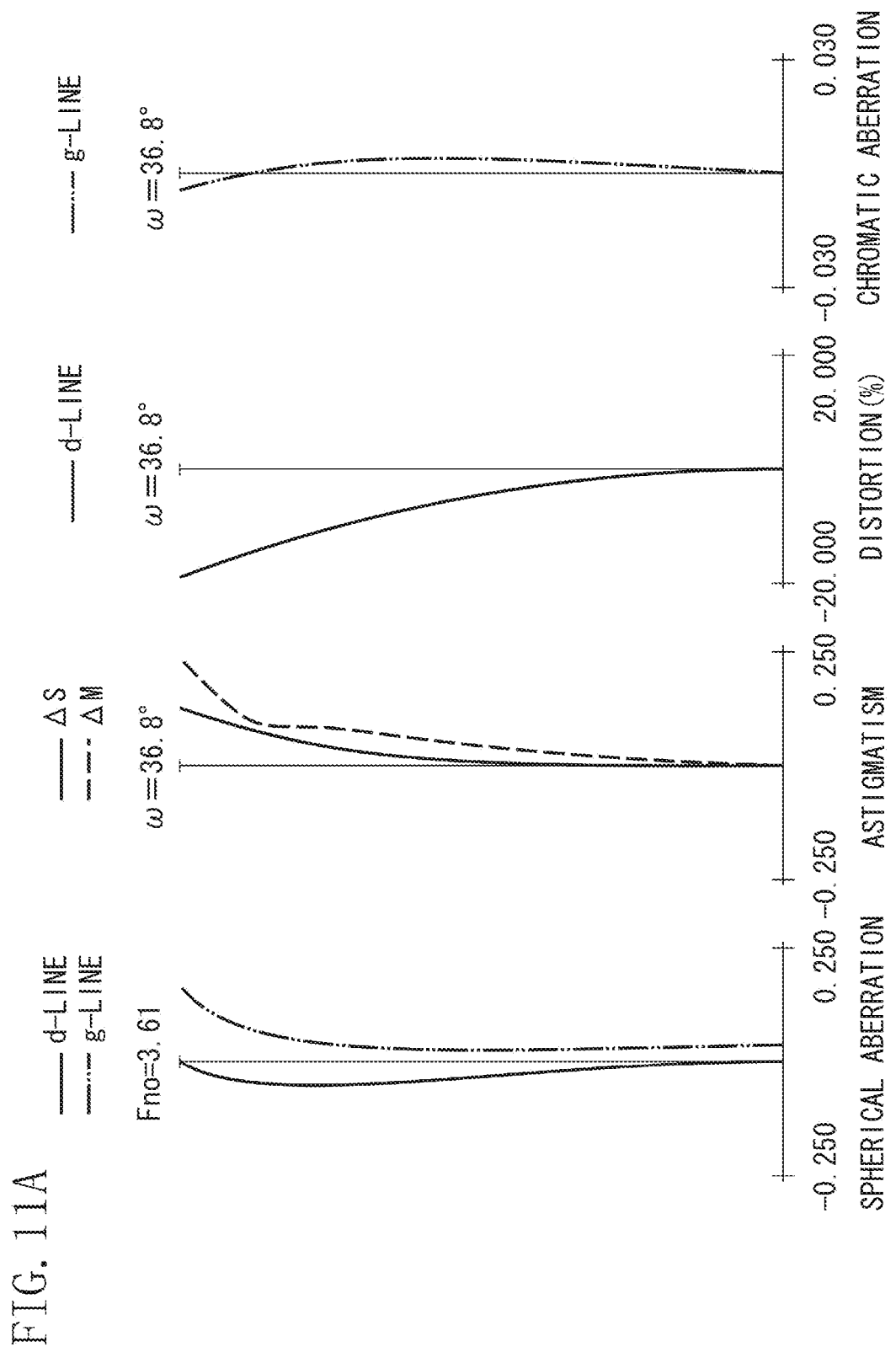
FIGS. 11A, 11B, and 11C are longitudinal aberration diagrams at the wide-angle end, the middle zoom position, and the telephoto end, respectively, when the zoom lens according to the fourth exemplary embodiment focuses on an infinite-distance object.
Figure 11B:
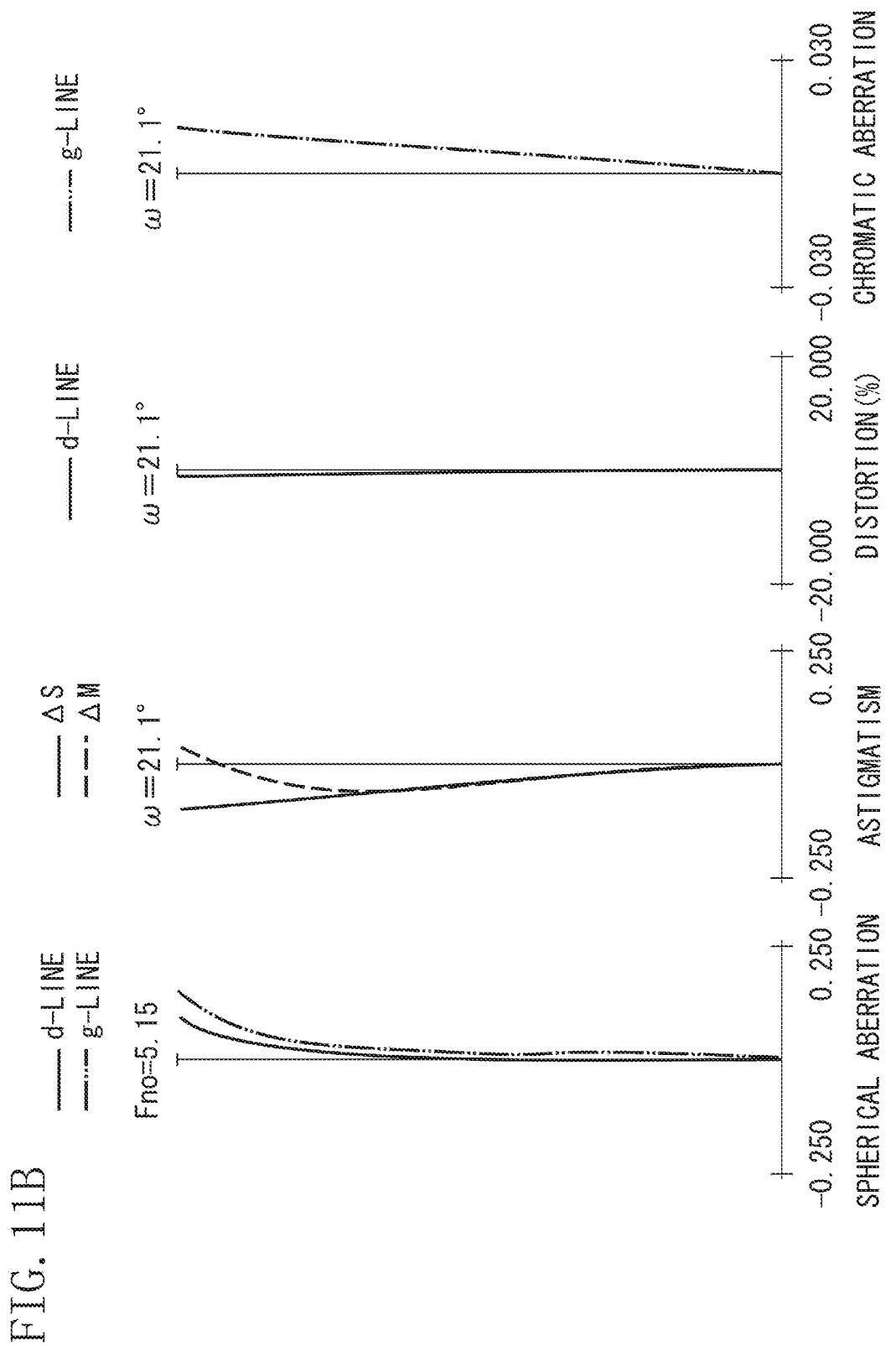
Figure 11C:
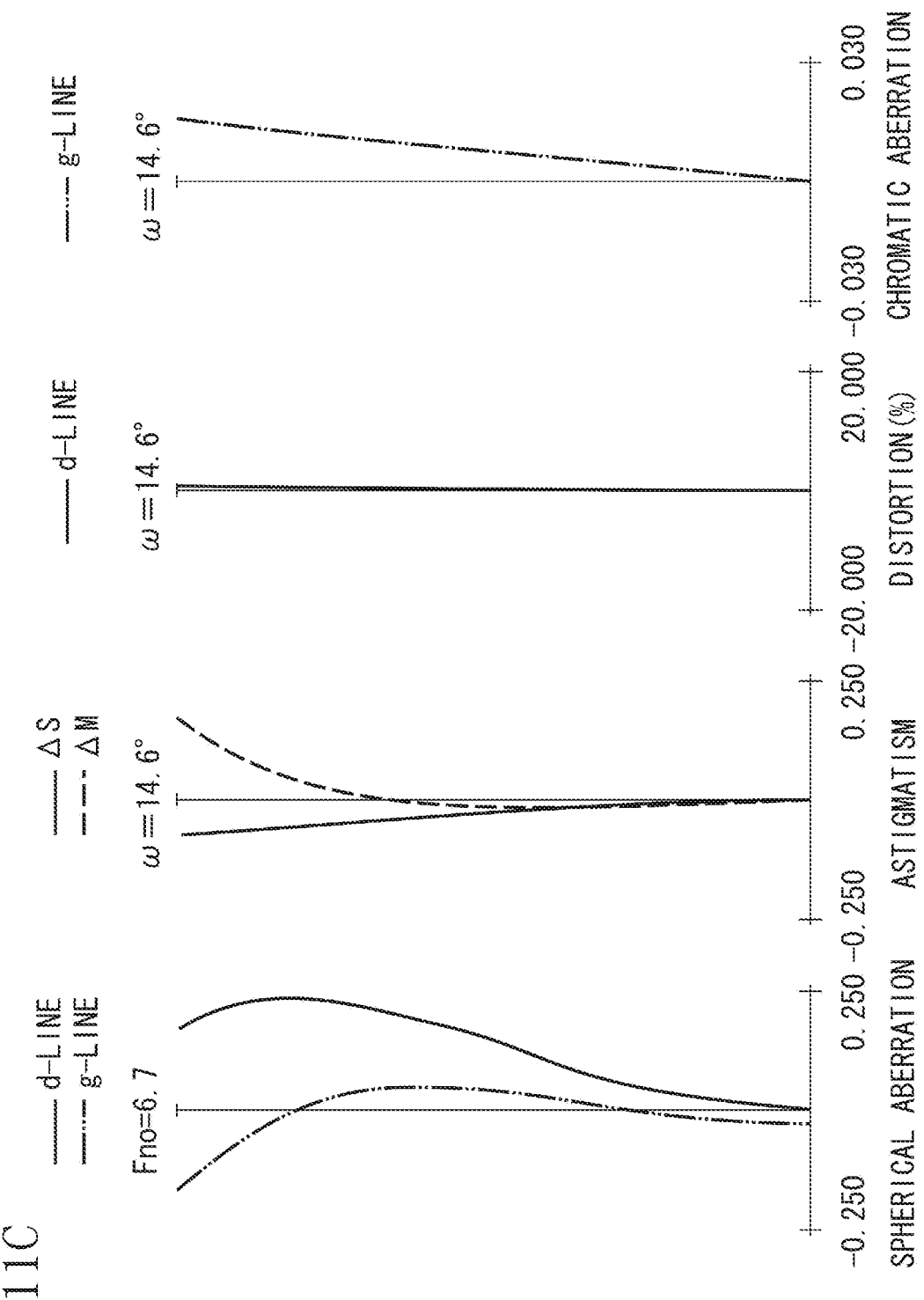
Figure 12B:
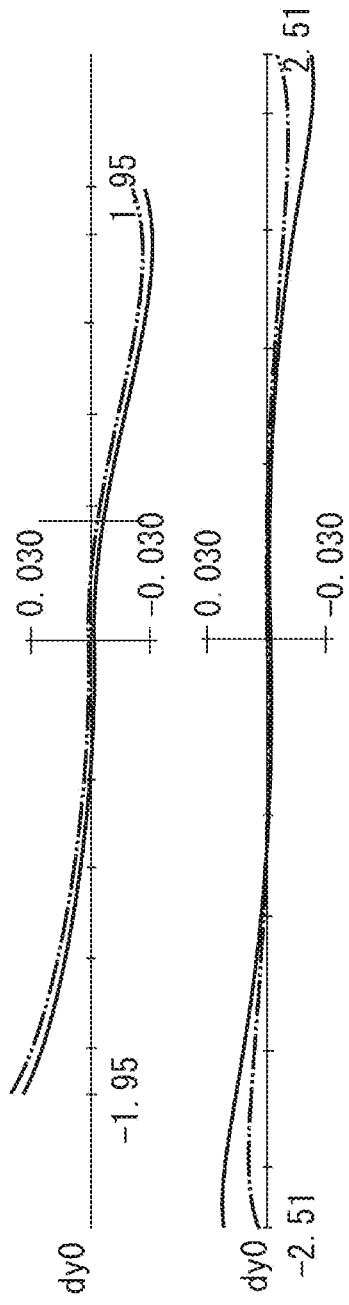

FIG. 10 is a lens cross-sectional view at a wide-angle end of a zoom lens according to a fourth exemplary embodiment of the present invention. FIGS. 11A, 11B, and 11C are longitudinal aberration diagrams at the wide-angle end, the middle zoom position, and the telephoto end, respectively, when the zoom lens according to the fourth exemplary embodiment focuses on an infinite-distance object. FIG. 12A is a longitudinal aberration diagram at the wide-angle end when the zoom lens focuses on a closest range object. FIG. 12B is a lateral aberration diagram at the wide-angle end when the zoom lens focuses on a closest range object at the axial point (Y=0) and at the point of 70% (Y=0.7 Ymax) of an image height.

Figure 13:
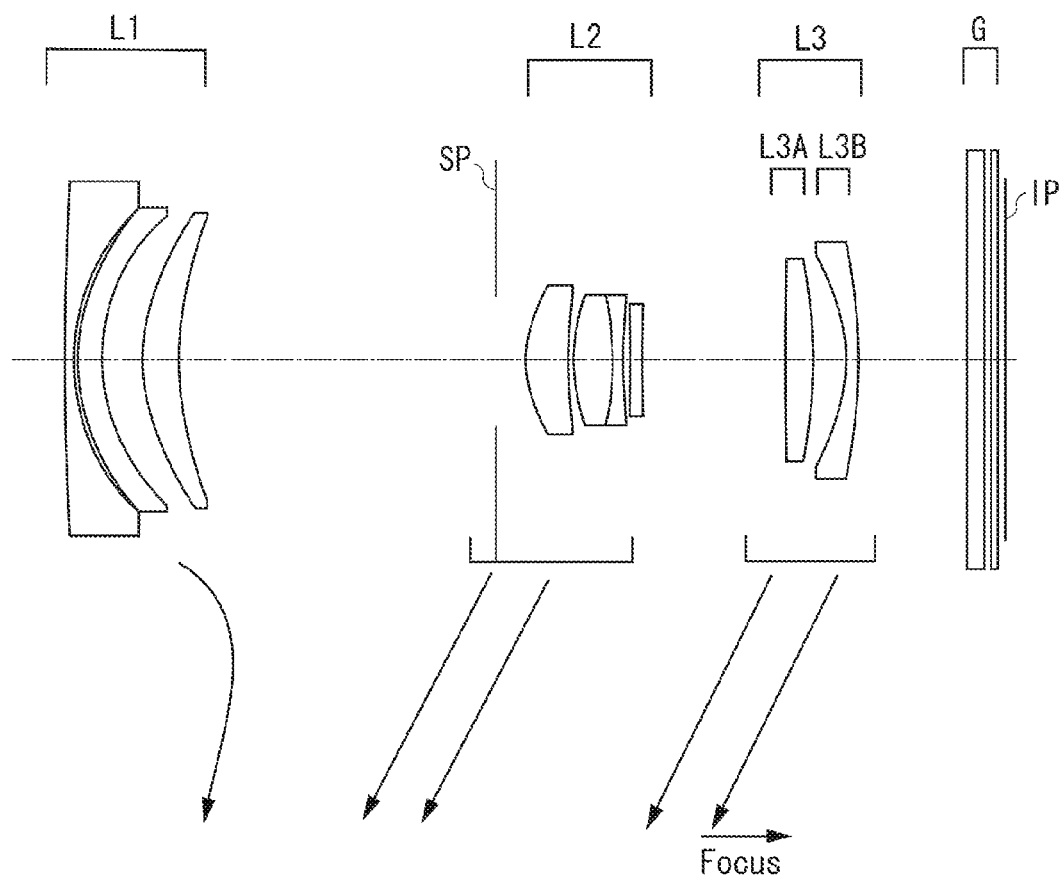
FIG. 13 is a lens cross-sectional view at a wide-angle end of a zoom lens according to a fifth exemplary embodiment of the present invention.
Figure 14A:
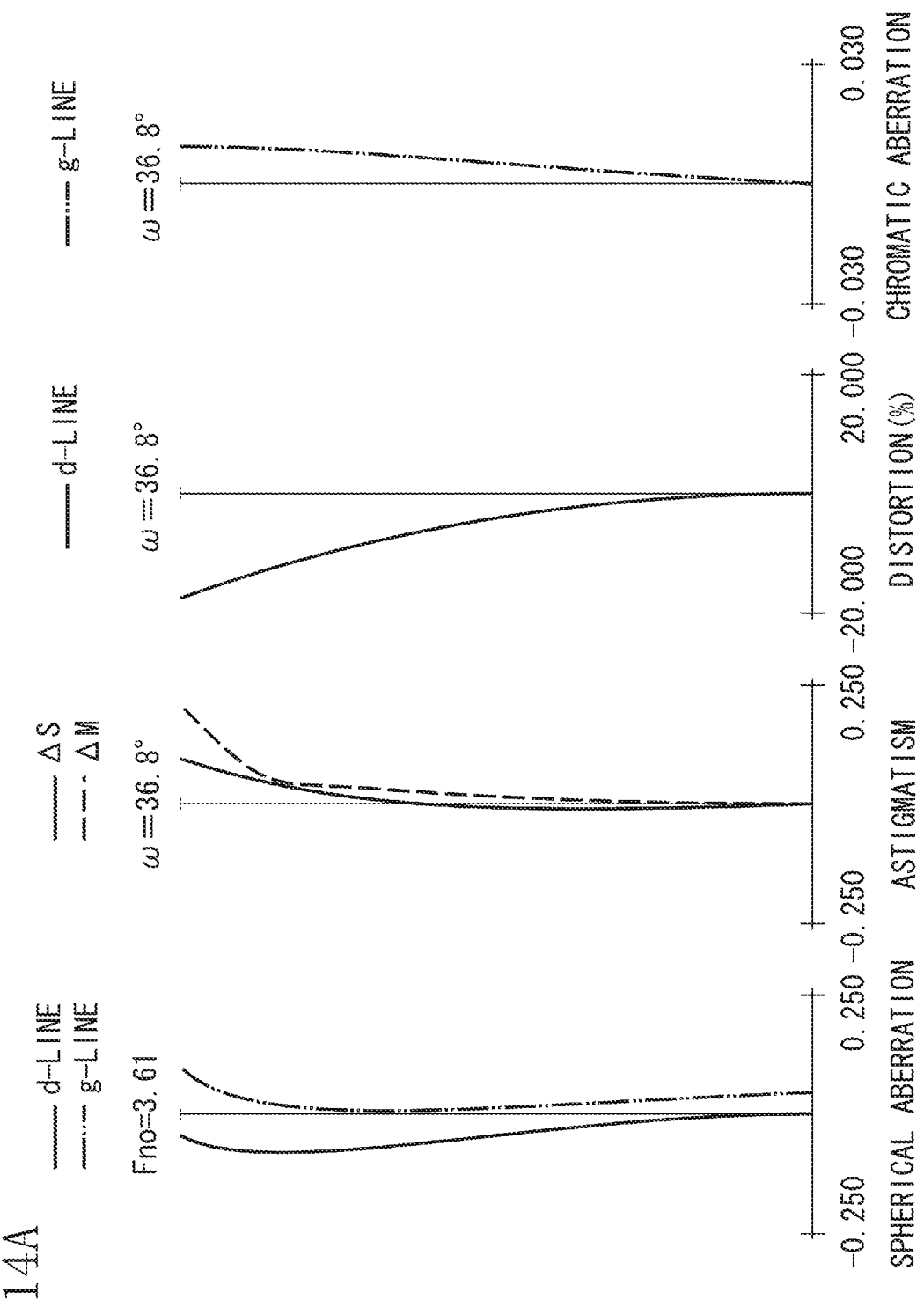
FIGS. 14A, 14B, and 14C are longitudinal aberration diagrams at the wide-angle end, the middle zoom position, and the telephoto end, respectively, when the zoom lens according to the fifth exemplary embodiment focuses on an infinite-distance object.
Figure 14B:
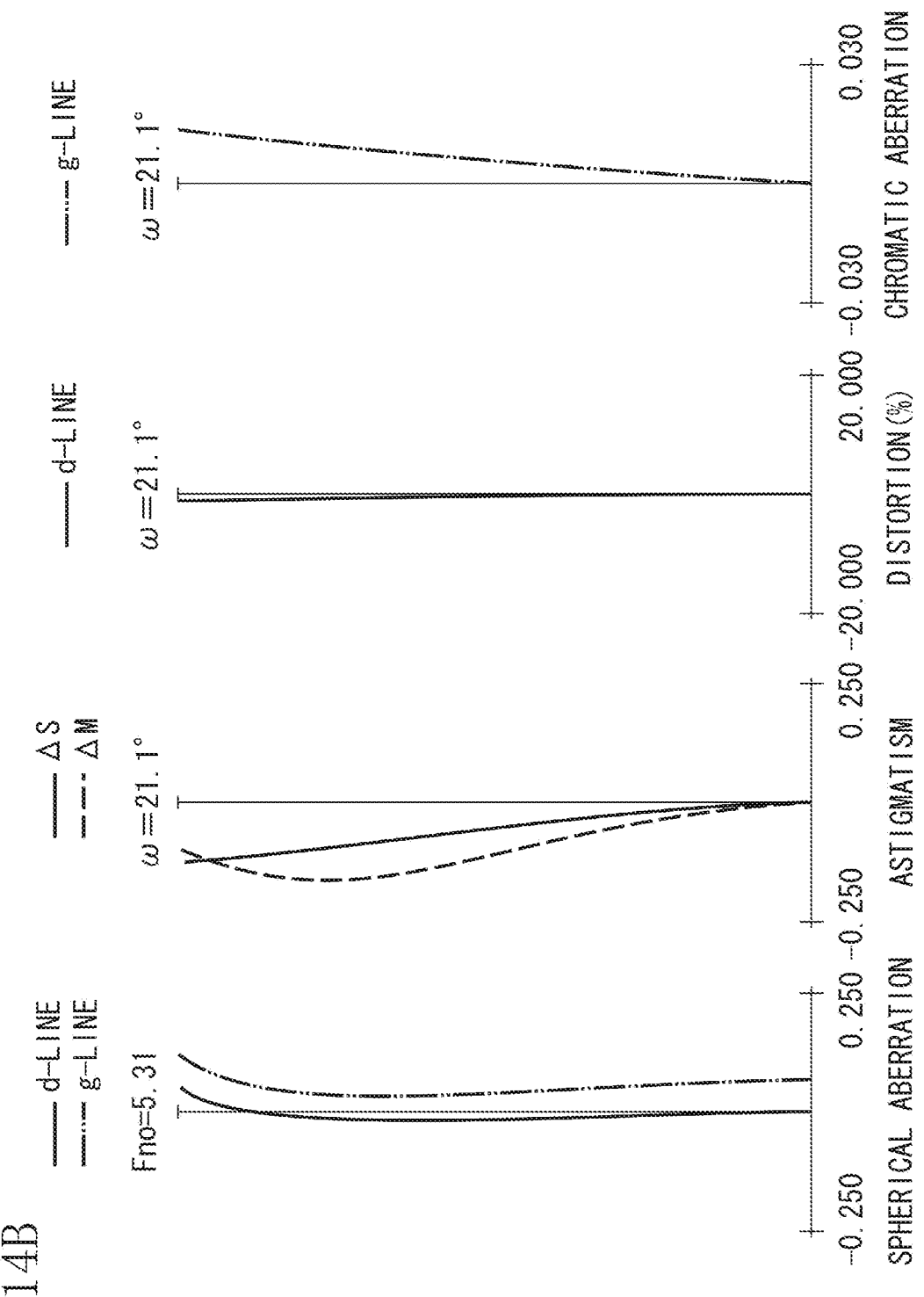
Figure 14C:
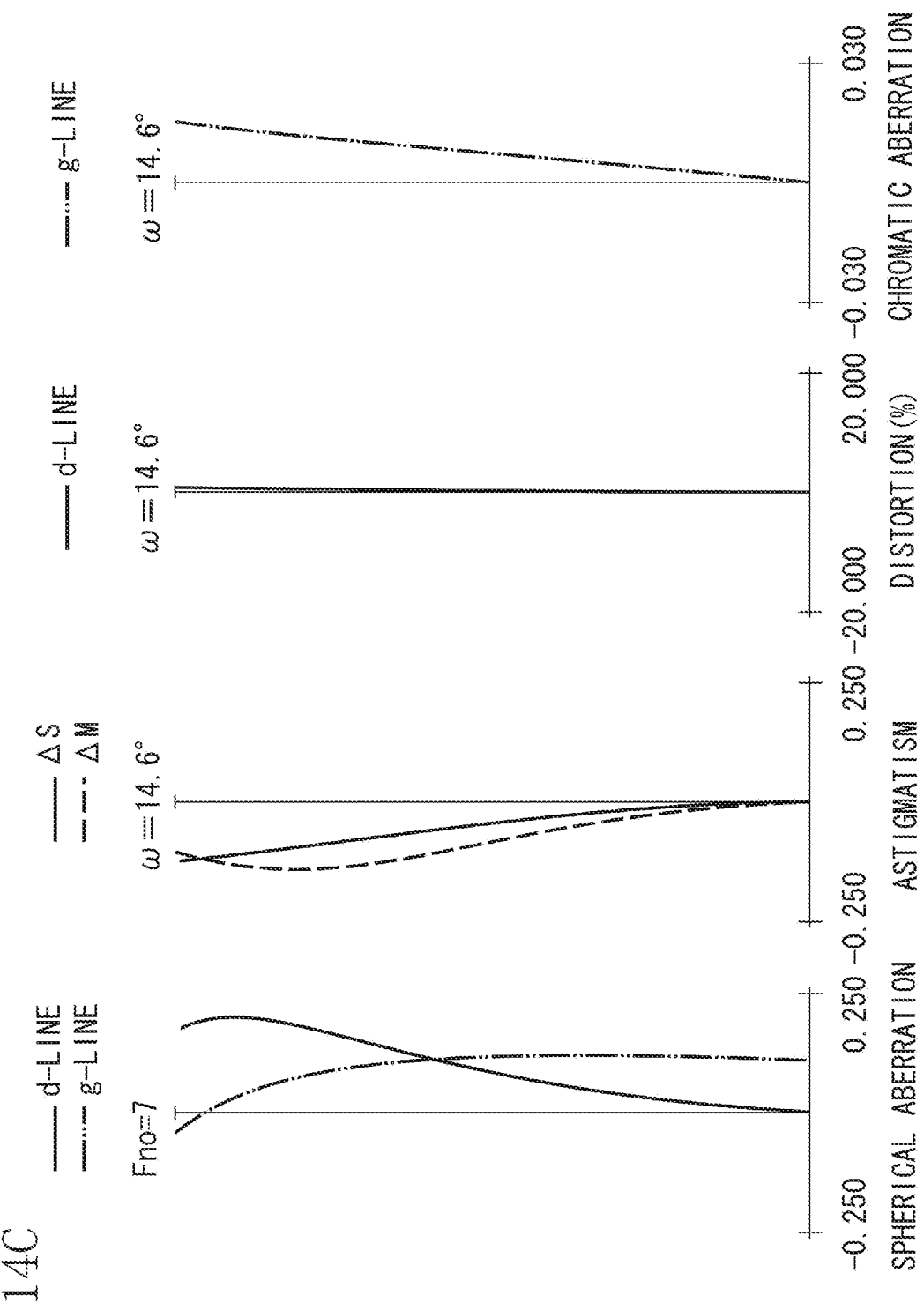

FIG. 13 is a lens cross-sectional view at a wide-angle end of a zoom lens according to a fifth exemplary embodiment of the present invention. FIGS. 14A, 14B, and 14C are longitudinal aberration diagrams at the wide-angle end, the middle zoom position, and the telephoto end, respectively, when the zoom lens according to the fifth exemplary embodiment focuses on an infinite-distance object. FIG. 15A is a longitudinal aberration diagram at the wide-angle end when the zoom lens focuses on a closest range object. FIG. 15B is a lateral aberration diagram at the wide-angle end when the zoom lens focuses on a closest range object at the axial point (Y=0) and at the point of 70% (Y=0.7 Ymax) of an image height.

Figure 16:
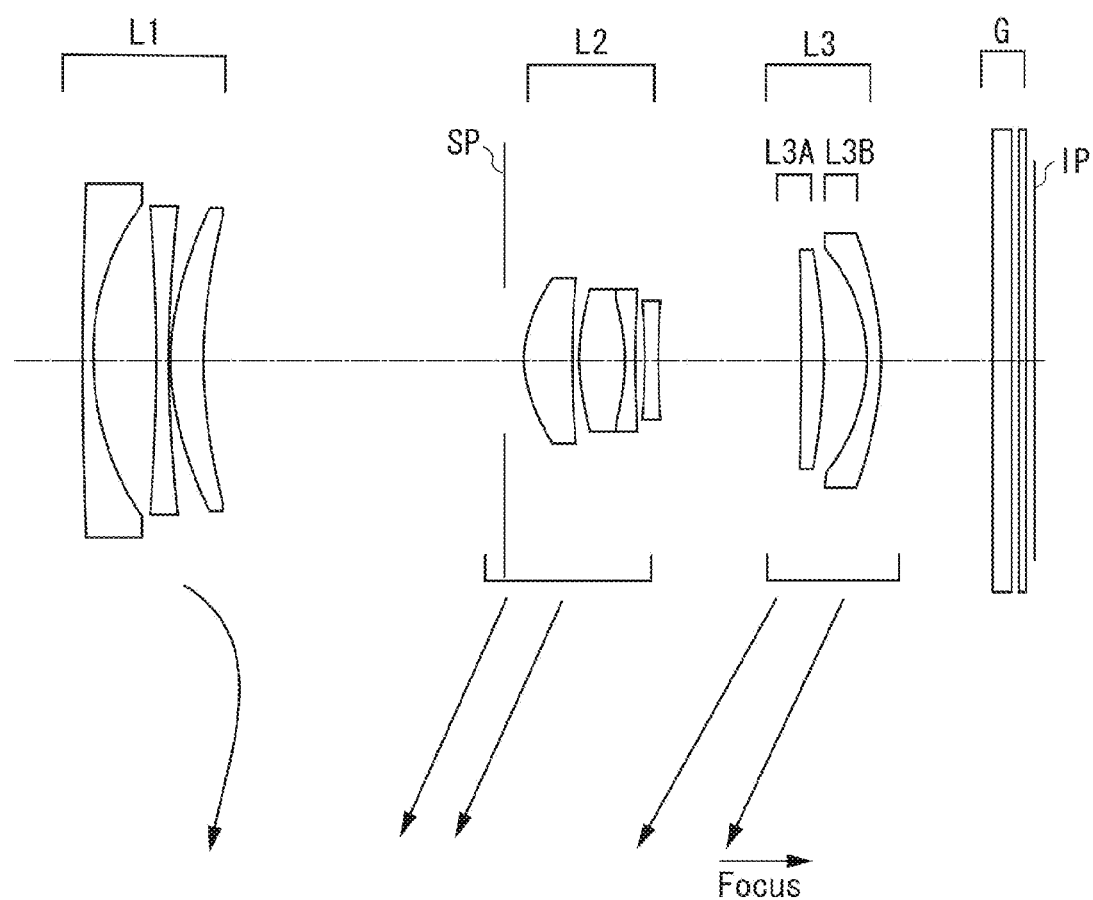
FIG. 16 is a lens cross-sectional view at a wide-angle end of a zoom lens according to a sixth exemplary embodiment of the present invention.
Figure 17C:
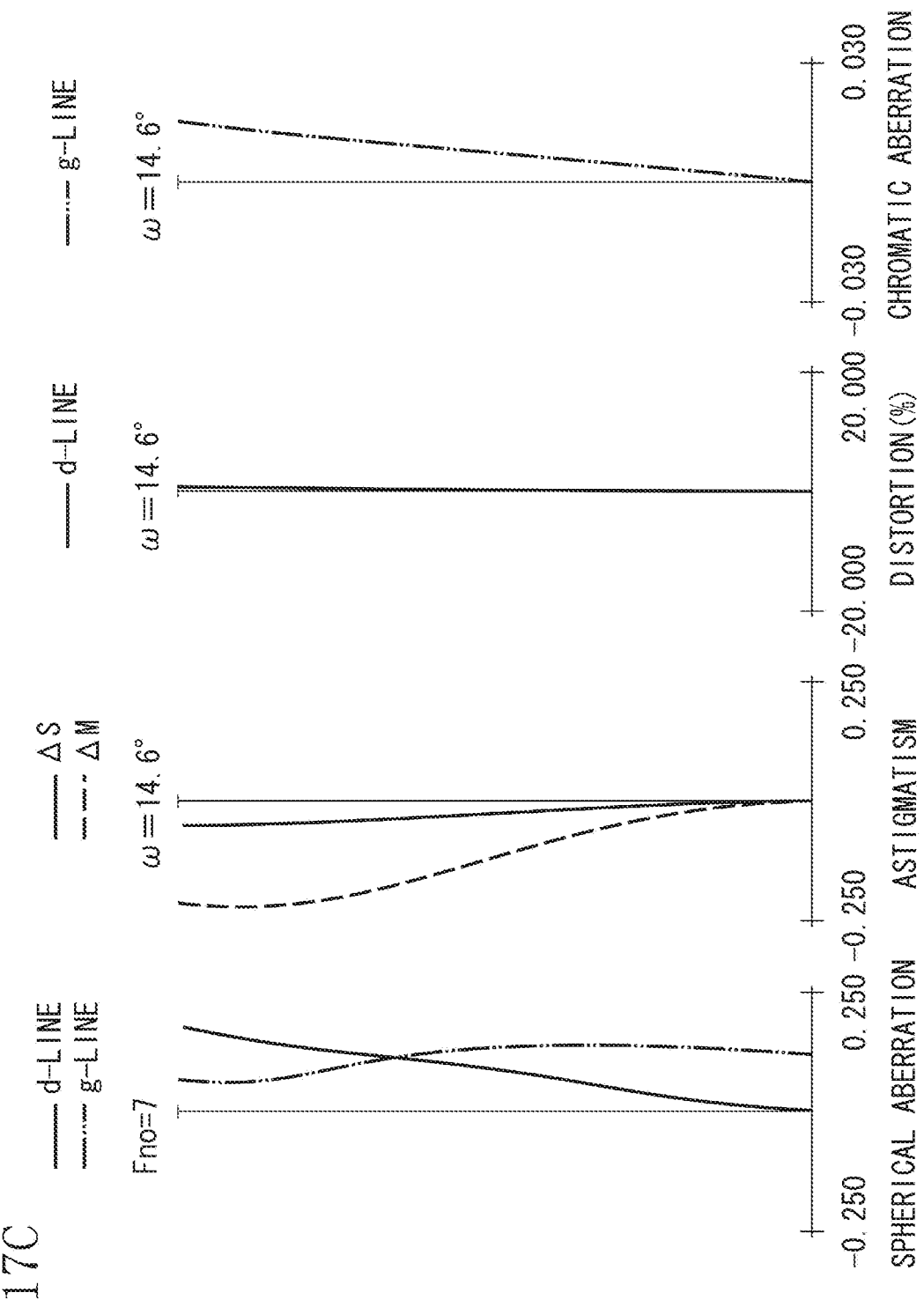
Figure 18A:
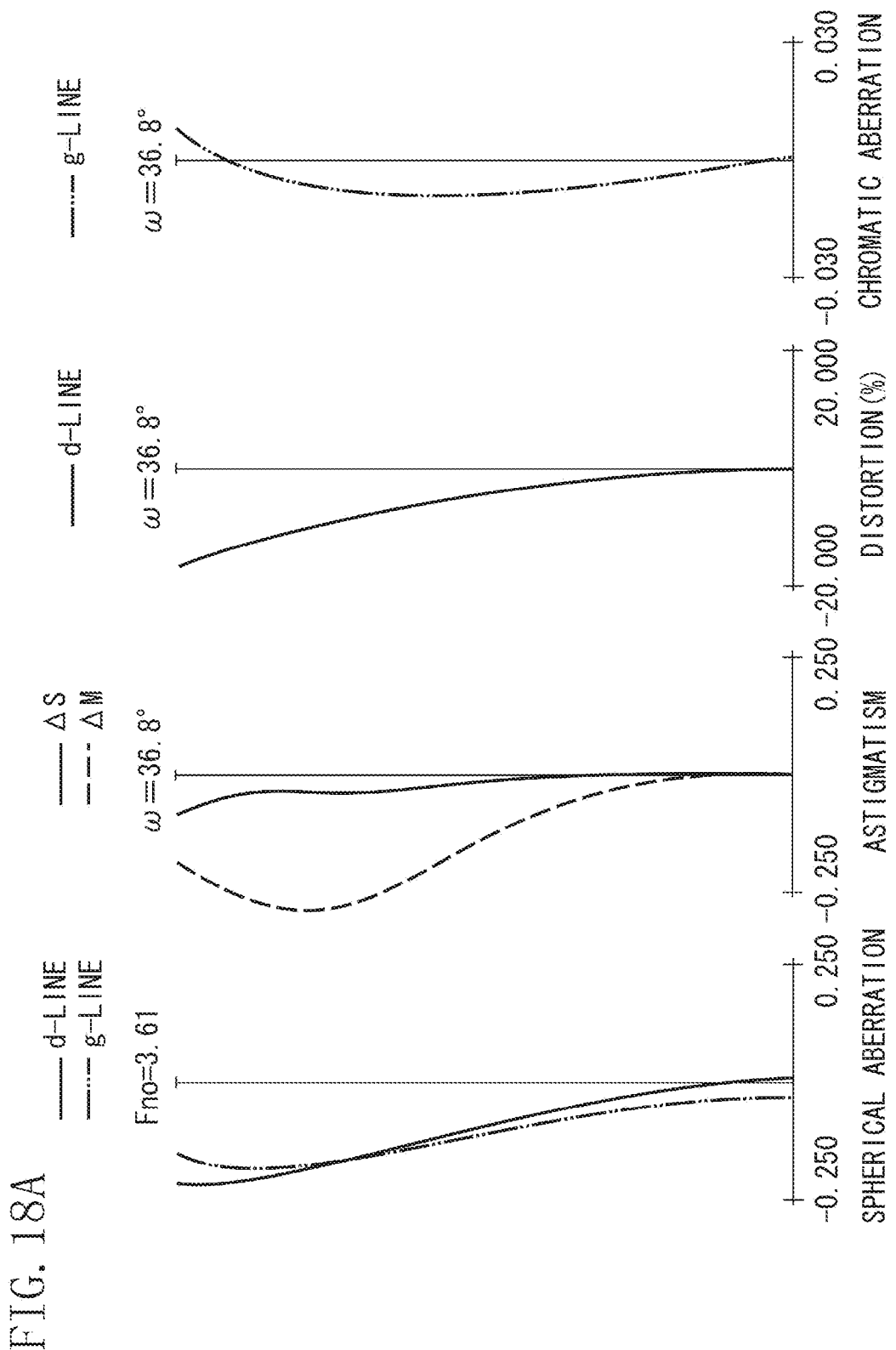
FIGS. 18A and 18B are respectively a longitudinal aberration diagram at the wide-angle end when the zoom lens focuses on a closest range object according to the sixth exemplary embodiment, and a lateral aberration diagram at the wide-angle end when the zoom lens focuses on the closest range object at the axial point (Y=0) and at the point of 70% (Y=0.7 Ymax) of an image height.
Figure 18B:
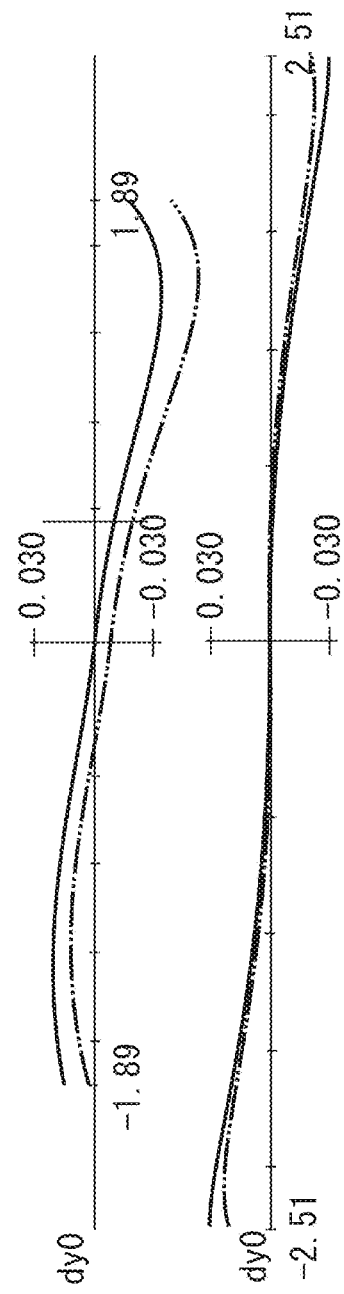
Figure 19:
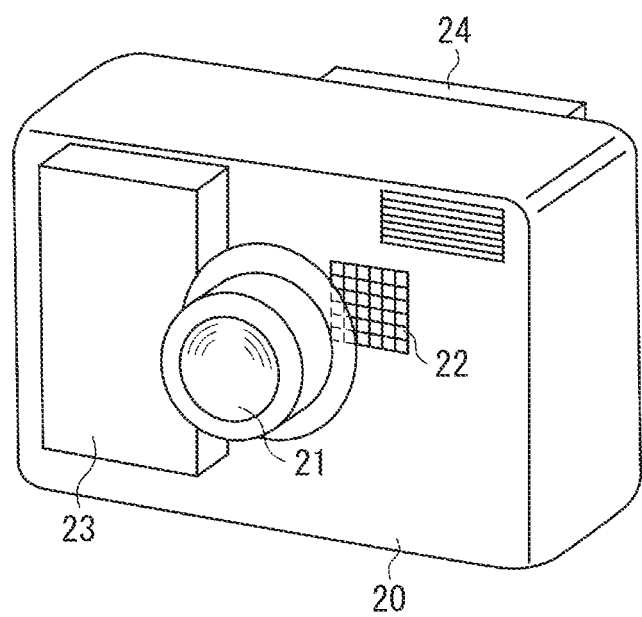
FIG. 19 is a schematic diagram of main components of an image pickup apparatus according to an exemplary embodiment of the present invention.

FIG. 16 is a lens cross-sectional view at the wide-angle end of a zoom lens according to a sixth exemplary embodiment of the present invention. FIGS. 17A, 17B, and 17C are longitudinal aberration diagrams at the wide-angle end, the middle zoom position, and the telephoto end, respectively, when the zoom lens according to the sixth exemplary embodiment focuses on an infinite-distance object. FIG. 18A is a longitudinal aberration diagram at the wide-angle end when the zoom lens focuses on a closest range object. FIG. 18B is a lateral aberration diagram at the wide-angle end when the zoom lens focuses on the closest range object at the axial point (Y=0) and at the point of 70% (Y=0.7 Ymax) of an image height. FIG. 19 is a schematic diagram of main components of an image pickup apparatus according to an exemplary embodiment of the present invention.

The zoom lens according to each of the exemplary embodiments is a photographic lens system used for an image pickup apparatus such as a video camera, a digital camera, a silver-halide film camera, and a monitoring camera. The zoom lens according to each of the exemplary embodiments can also be used as a projection optical system for a projection apparatus (projector).

In the lens cross-sectional views, the left hand side is the object side (front) and the right hand side is the image side (rear). Further, in the lens cross-sectional views, Li denotes the i-th lens unit where i is the order of the lens unit counted from the object side. An aperture stop SP is also illustrated. An optical block G corresponds to an optical filter, a face plate, a low-pass filter, an infrared cut filter, and the like.

An image plane IP is also illustrated. When a zoom lens is used as a photographic optical system for a video camera or a digital camera, the image plane IP corresponds to an imaging surface of a solid-state image sensor (photoelectric conversion element), such as a charge-coupled device (CCD) sensor or a complementary metal-oxide semiconductor (CMOS) sensor. When a zoom lens is used as a photographic optical system for a silver-halide film camera, the image plane IP corresponds to a film surface. Arrows indicate movement loci and moving directions of the lens units during focusing from an infinite-distance object to a near-distance object during zooming from the wide-angle end to the telephoto end.

In the longitudinal aberration diagrams, "d-line" denotes the d-line, "g-line" denotes the g-line, ΔM denotes a meridional image plane, and ΔS denotes a sagittal image plane. Chromatic aberration of magnification (lateral chromatic aberration) is expressed with the d-line. In the longitudinal aberration diagrams, ω denotes a half angle of view (photographing half angle of view) (degrees) and Fno denotes an F-number. In the lateral aberration diagrams, a solid-line indicates the d-line and a dashed-line indicates the g-line. Meanwhile, in each of the exemplary embodiments below, the wide-angle end and the telephoto end refer to zoom positions assumed when a variable power lens unit (for example, the third lens unit L3) is positioned at respective ends of a range in which the lens unit is mechanically movable along the optical axis.

The zoom lens according to each of the exemplary embodiments includes, in order from an object side to an image side, a first lens unit L1 having negative refractive power, a second lens unit L2 having positive refractive power, and a third lens unit L3 having negative refractive power. The third lens unit L3 includes a lens subunit L3A having positive refractive power and a lens subunit L3B having negative refractive power. The first lens unit L1 and the second lens unit L2 move during zooming so that a distance between the first lens unit L1 and the second lens unit L2 becomes larger at the telephoto end than at the wide-angle end. The lens subunit L3B moves toward the image side during focusing from an infinite-distance object to a near-distance object.

The lens subunit L3A and the lens subunit L3B may move with movement loci different from each other or with the same movement locus during zooming.

In the first, third, and fifth exemplary embodiments, the lens subunit L3A and the lens subunit L3B move integrally with each other during zooming. In the second, fourth, and sixth exemplary embodiments, the lens subunit L3A and the lens subunit L3B move in loci different from each other during zooming. Therefore, in the second, fourth, and sixth exemplary embodiments, the zoom lens may be treated as a four-unit zoom lens.

In each of the exemplary embodiments, the lens subunit L3B is moved during focusing to cause spherical aberration, and fluctuation of curvature of field due to a change in the object distance caused by grazing incidence and negative distortion is corrected, so that curvature of field is reduced throughout the object distance.

The zoom lens according to each of the exemplary embodiments satisfies at least one of the conditions below. In the conditions below, a radius of curvature of an air-contact surface on the object side of a single lens having negative refractive power or a cemented lens having negative refractive power which has the smallest absolute value of a focal length of the lens subunit L3B is R3Ba. Also, a radius of curvature of an air-contact surface on the image side of the single lens having negative refractive power or a cemented lens having negative refractive power which has the smallest absolute value of the focal length of the lens subunit L3B is R3Bb. The focal length of the lens subunit L3A is f3A. The focal length of the lens subunit L3B is f3B.

An amount of movement of the lens subunit L3A during zooming from the wide-angle end to the telephoto end is x3A and an amount of movement of the lens subunit L3B during zooming from the wide-angle end to the telephoto end is x3B. Here, it is assumed that the amount of movement of the lens subunit during zooming from the wide-angle end to the telephoto end is a difference between the optical axial position of the lens subunit at the wide-angle end and the optical axial position of the lens subunit at the telephoto end.

When the zoom lens according to an exemplary embodiment of the present invention is used for an image pickup apparatus which includes an image sensor, a distance on the optical axis from a lens surface nearest to the object side at the telephoto end to the image plane is TLt, the focal length of the entire zoom lens at the telephoto end is ft, and a photographing half angle of view at the telephoto end is ωt (degrees). With the above-described definition, at least one of the conditions below is satisfied:

$$1.05 < (R3Bb+R3Ba)/(R3Bb-R3Ba) < 3.00 \quad (1)$$

$$1.0 < f3A/|f3B| < 2.5 \quad (2)$$

$$0.85 < x3A/x3B < 1.20 \quad (3)$$

$$3.0 < TLt/ft*\tan(\omega t) < 6.5 \quad (4)$$

Next, the technical meaning of each of the conditions will be described.

The condition (1) relates to the lens shape of the lens subunit L3B having negative refractive power and defines distribution of refractive power between the object-side lens surface and the image-side lens surface. When the condition (1) is satisfied, the lens subunit L3B has a concentric lens shape, corrects spherical aberration to be well-balanced as a whole by generating spherical aberration while preventing curvature of field from occurring during focusing. When the lens subunit L3B goes out of the range of the condition (1), the concentric lens shape is lost, much curvature of field occurs, and it becomes difficult for the lens subunit L3B to correct spherical aberration to be well-balanced.

The condition (2) defines a ratio between the focal lengths of the lens subunit L3A having positive refractive power and the lens subunit L3B having negative refractive power. When the condition (2) is satisfied, the lens subunit L3B can obtain proper focus sensitivity. When the upper limit of the condition (2) is exceeded, the focal length of the lens subunit L3B becomes too short and much spherical aberration occurs. When the lower limit of the condition (2) is exceeded, the focus sensitivity of the lens subunit L3B becomes too small and it becomes difficult to downsize the entire zoom lens.

The condition (3) defines a ratio between the amounts of movement of the lens subunit L3A and the lens subunit L3B during zooming from the wide-angle end to the telephoto end. When the condition (3) is satisfied, the lens subunit L3A and the lens subunit L3B move integrally with each other, making it easier to reduce the lens diameter. When the upper limit of the condition (3) is exceeded, the lens diameter of the lens subunit L3B becomes so large that it becomes difficult to reduce the lens diameter. When the lower limit of the condition (3) is exceeded, the distance between the lens subunit L3A and the lens subunit L3B becomes small at the telephoto end, and accordingly, the refractive power of the third lens unit L3 increases. As a result, various aberrations increase, which is not desirable.

The condition (4) defines relationship between the total lens length and the photographing angle of view at the telephoto end. Satisfaction of the condition (4) defines the proper total lens length. When the upper limit of the condition (4) is exceeded, the total lens length becomes large, making it difficult to reduce the entire zoom lens. When the lower limit of the condition (4) is exceeded, power of each of the lens units increases, and accordingly, it becomes difficult to properly correct various aberrations. In each of the exemplary embodiments, the ranges of the numerical values for the conditions (1) to (4) can be set as follows:

$$1.2 < (R3Bb+R3Ba)/(R3Bb-R3Ba) < 2.9 \quad (1a)$$

$$1.2 < f3A/|f3B| < 2.3 \quad (2a)$$

$$0.95 < x3A/x3B < 1.10 \quad (3a)$$

$$4.0 < TLt/ft*\tan(\omega t) < 6.0 \quad (4a)$$

In each of the exemplary embodiments, the ranges of the numerical values for the conditions (1a) to (4a) can be further set as follows:

$$1.40 < (R3Bb+R3Ba)/(R3Bb-R3Ba) < 2.90 \quad (1b)$$

$$1.40 < f3A/|f3B| < 2.20 \quad (2b)$$

$$0.99 < x3A/x3B < 1.10 \quad (3b)$$

$$4.50 < TLt/ft*\tan(\omega t) < 5.50 \quad (4b)$$

With the above-described configuration, each of the exemplary embodiments realizes a zoom lens which is compact as a whole and can easily perform fast focusing even with a large image sensor. In each of the exemplary embodiments, at least one of the requirements below can be satisfied.

The lens subunit L3B may include a single lens or a single cemented lens. By forming the lens subunit L3B with a single lens or a single cemented lens, the weight of the focus lens unit can be reduced. The lens subunit L3B may move toward the object side either with a movement locus different from the movement locus of the lens subunit L3A or with the same movement locus during zooming from the wide-angle end to the telephoto end. The lens diameter of the lens subunit L3B is easily reduced by configuring the zoom lens to move the lens subunit L3B toward the object side during zooming from the wide-angle end to the telephoto end.

The first lens unit L1 may include three or less lenses in total, including at least one each of: a lens having negative refractive power or a cemented lens having negative refractive power; and a lens having positive refractive power or a cemented lens having positive refractive power, in order from the object side to the image side. By configuring the first lens unit L1 with three or less lenses in total, it is easy to make the collapsed form of the zoom lens thinner.

Next, the lens configuration of each of the exemplary embodiments will be described. In the zoom lens according to the first exemplary embodiment illustrated in FIG. 1, the second lens unit L2 moves toward the object side as denoted by the arrow during zooming from the wide-angle end to the telephoto end. The lens subunit L3A having positive refractive power and the lens subunit L3B having negative refractive power included in the third lens unit L3 move toward the object side with the same locus. The first lens unit L1 moves with a locus convex toward the image side. The aperture stop SP is arranged on the object side of the second lens unit L2 and moves toward the object side with a locus different from the locus of each of the lens units during zooming.

Focusing from an infinite-distance object to a finite-distance object is performed by moving the lens subunit L3B having negative refractive power, which forms a part of the third lens unit L3, toward the image side.

The present exemplary embodiment uses the light-weight lens subunit L3B included in the third lens unit L3 as a focus lens unit to facilitate quick focusing. Also, the present exemplary embodiment corrects fluctuation of curvature of field associated with focusing on a closest range object by spherical aberration caused by the lens subunit L3B.

Next, the lens configuration of each of the lens units will be described. Hereafter, the lens configuration is described in order from the object side to the image side. The first lens unit L1 includes a meniscus negative lens with its image-side lens surface having an aspheric shape and its concave surface facing the image side, and a meniscus positive lens with its convex surface facing the object side. The second lens unit L2 includes a meniscus positive lens with both surfaces having an aspheric shape and its convex surface facing the object side, a meniscus negative lens with its concave surface facing the image side, and a positive lens.

The lens subunit L3A constituting the third lens unit L3 includes a meniscus positive lens with its convex surface facing the image side, and the lens subunit L3B constituting the third lens unit L3 includes a meniscus negative lens with its object-side lens surface having an aspheric shape and its concave surface facing the object side. The aperture stop SP is arranged between the first lens unit L1 and the second lens unit L2.

Next, the zoom lens according to the second exemplary embodiment illustrated in FIG. 4 will be described. The second exemplary embodiment is different from the first exemplary embodiment in that the zoom system and the lens configuration of the second lens unit L2 are altered. The second lens unit L2 includes, in order from the object side to the image side, a positive lens, a positive lens, a negative lens, and a positive lens. Further, the positive lens nearest to the image side has the image-side lens surface in the aspheric shape.

In the zoom lens according to the second exemplary embodiment illustrated in FIG. 4, the second lens unit L2 moves toward the object side as denoted by the arrow during zooming from the wide-angle end to the telephoto end. The lens subunit L3A having positive refractive power and the lens subunit L3B having negative refractive power included in the third lens unit L3 move toward the object side while decreasing the distance therebetween. The first lens unit L1 moves with a locus convex toward the image side. The other part of the configuration is similar to the configuration according to the first exemplary embodiment.

Next, the zoom lens according to the third exemplary embodiment illustrated in FIG. 7 will be described. The third exemplary embodiment is different from the first exemplary embodiment in that the lens configuration of the second lens unit L2 and the position of the aperture stop SP are altered. The second lens unit L2 includes a positive lens with both surfaces having an aspheric shape, a cemented lens including a positive lens with its convex surface at the object side joined with a negative lens with its concave surface at the image side, and a meniscus positive lens with its convex surface facing the image side. Further, the image-side lens surface of the positive lens of the second lens unit L2 nearest to the image side is in the aspheric shape. The aperture stop SP is arranged on the image side of the second lens unit L2 and moves with the same locus as that of the second lens unit L2 during zooming. The other part of the configuration is similar to the configuration according to the first exemplary embodiment.

Next, the zoom lens according to the fourth exemplary embodiment illustrated in FIG. 10 will be described. The fourth exemplary embodiment is different from the first exemplary embodiment in that the lens configuration of the second lens unit L2 and the movement loci of the lens subunit L3A and the lens subunit L3B of the third lens unit L3 during zooming are altered.

The second lens unit L2 includes, in order from the object side to the image side, a positive lens with its object-side lens surface having an aspheric shape, a cemented lens obtained by joining a biconvex positive lens and a biconcave negative lens, and a meniscus negative lens with its image-side lens surface having an aspheric shape.

In the zoom lens according to the fourth exemplary embodiment illustrated in FIG. 10, the second lens unit L2 moves toward the object side as denoted by the arrow during zooming from the wide-angle end to the telephoto end. The lens subunit L3A having positive refractive power and the lens subunit L3B having negative refractive power included in the third lens unit L3 move toward the object side while increasing the distance therebetween. The other part of the configuration is similar to the configuration according to the first exemplary embodiment.

Next, the zoom lens according to the fifth exemplary embodiment illustrated in FIG. 13 will be described. The fifth exemplary embodiment is different from the first exemplary embodiment in the lens configurations of the first lens unit L1 and the second lens unit L2. The first lens unit L1 includes, in order from the object side to the image side, a meniscus negative lens with its concave surface facing the image side, and two meniscus positive lenses with their concave surfaces facing the image side. The second lens unit L2 includes a positive lens with its object-side surface having an aspheric shape, a cemented lens obtained by joining a biconvex positive lens and a biconcave negative lens, and a negative lens with its image-side surface having an aspheric shape. The other part of the configuration is similar to the configuration according to the first exemplary embodiment.

Next, the zoom lens according to the sixth exemplary embodiment illustrated in FIG. 16 will be described. The sixth exemplary embodiment is different from the first exemplary embodiment in that the lens configuration of the first lens unit L1, the lens configuration of the second lens unit L2, and the movement loci of the lens subunits L3A and L3B of the third lens unit L3 during zooming are altered.

The first lens unit L1 includes, in order from the object side to the image side, a meniscus negative lens with its concave surface facing the image side, a biconcave negative lens with its image-side lens surface having an aspheric shape, and a meniscus positive lens with its convex surface facing the object side. The second lens unit L2 includes a positive lens with its object-side surface having an aspheric shape, a cemented lens obtained by joining a biconvex positive lens and a biconcave negative lens, and a negative lens with its image-side surface having an aspheric shape.

In the zoom lens according to the sixth exemplary embodiment illustrated in FIG. 16, the second lens unit L2 moves toward the object side as denoted by the arrow during zooming from the wide-angle end to the telephoto end. The lens subunit L3A having positive refractive power and the lens subunit L3B having negative refractive power included in the third lens unit L3 move toward the object side while increasing the distance therebetween. The other part of the configuration is similar to the configuration according to the first exemplary embodiment.

Next, numerical examples 1 to 6 corresponding to the first to sixth exemplary embodiments of the present invention will be provided below. In each numerical example, i denotes the order of a surface counted from the object side and ri is a radius of curvature of the lens surface. Also, di is a lens thickness and an air distance between the i-th surface and the (i+1)th surface. Further, ndi and vdi are a refractive index and an Abbe number, respectively, at the d-line, and * indicates that the surface is aspheric. Meanwhile, the four surfaces nearest to the image side are made of glass such as a face plate. In each numerical example, k, A4, A6, A8, and A10 are aspheric coefficients.

The aspheric shape is expressed by $x=(h^2/R)/[1+\{1-(1+k)(h/R)^2\}^{1/2},]+A4 \cdot h^4+A6 \cdot h^6+A8 \cdot h^8+A10 \cdot h^{10}$ where the displacement in the optical axis direction at the position of height h from the optical axis is x based on the surface vertex. In the above expression, R represents a paraxial radius of curvature.

"e±XX" in each aspheric coefficient means "×10±XX".

A back focus BF is a distance from the final surface (glass block surface) to the image plane. Distance d5 in the numerical example 2, part of Distance d5 in the numerical example 4, part of Distance d7 in the numerical example 5, and part of Distance d7 in the numerical example 6 are negative. This is because the aperture stop SP and the lens of the second lens unit L2 nearest to the object side are counted in order from the object side to the image side. Relationship between the above-described conditions and the respective numerical examples is listed in Table 1.

Numerical Example 1

Unit: mm

Surface data

| Surface number | r | d | nd | vd | Effective diameter |
|---|---|---|---|---|---|
| 1 | 630.930 | 2.00 | 1.85135 | 40.1 | 23.69 |
| 2* | 14.274 | 2.71 | | | 19.32 |
| 3 | 16.615 | 2.70 | 1.92286 | 20.9 | 19.42 |
| 4 | 28.019 | (variable) | | | 18.68 |
| 5(stop) | ∞ | (variable) | | | 9.14 |
| 6* | 9.988 | 2.80 | 1.59201 | 67.0 | 9.62 |
| 7* | 57.271 | 0.86 | | | 9.13 |
| 8 | 18.862 | 0.90 | 1.84666 | 23.8 | 8.73 |
| 9 | 9.964 | 0.76 | | | 8.22 |
| 10 | 19.817 | 1.70 | 1.55332 | 71.7 | 8.23 |
| 11 | −40.328 | (variable) | | | 8.07 |
| 12 | −133.988 | 1.80 | 1.80518 | 25.4 | 12.03 |
| 13 | −24.167 | 2.15 | | | 12.44 |
| 14* | −12.621 | 1.10 | 1.80139 | 45.5 | 12.73 |
| 15 | −70.306 | (variable) | | | 14.30 |
| 16 | ∞ | 1.20 | 1.51633 | 64.1 | 30.00 |
| 17 | ∞ | 0.50 | | | 30.00 |
| 18 | ∞ | 0.50 | 1.51633 | 64.1 | 30.00 |
| 19 | ∞ | | | | 30.00 |
| Image plane | ∞ | | | | |

Aspheric surface data

Second surface

K = 0.00000e+000 A4 = 1.05597e−006 A6 = 1.25558e−007
A8 = −1.50164e−009 A10 = 6.60752e−012
Sixth surface K = 0.00000e+000 A4 = −7.49169e−005 A6 = −3.83056e−007
A8 = −5.11542e−009
Seventh surface K = 0.00000e+000 A4 = 9.58427e−006
Fourteenth surface K = 0.00000e+000 A4 = −6.87375e−006 A6 = −1.87280e−007
A8 = 2.83233e−009

Various data
Zoom ratio: 2.55

| | Wide-angle | Middle | Telephoto |
|---|---|---|---|
| Focal length | 18.20 | 32.56 | 46.35 |
| F-number | 3.61 | 5.04 | 6.47 |
| Half angle of view (degree) | 36.83 | 22.71 | 16.39 |
| Image height | 13.63 | 13.63 | 13.63 |
| Total lens length | 63.75 | 57.99 | 61.36 |
| BF | 0.50 | 0.50 | 0.50 |
| d4 | 20.69 | 7.19 | 2.83 |
| d5 | 1.77 | 1.09 | 0.42 |
| d11 | 10.74 | 10.86 | 10.23 |
| d15 | 8.38 | 16.68 | 25.72 |
| Entrance pupil position | 14.47 | 9.04 | 6.48 |

-continued

Unit: mm

| | | | |
|---|---|---|---|
| Exit pupil position | −24.04 | −32.02 | −40.43 |
| Front principal point position | 19.17 | 9.00 | 0.34 |
| Rear principal point position | −17.70 | −32.06 | −45.85 |

Zoom lens unit data

| Unit | Start surface | Focal length | Lens configuration length | Front principal point position | Rear principal point position |
|---|---|---|---|---|---|
| L1 | 1 | −31.46 | 7.41 | 0.44 | −4.65 |
| SP | 5 | ∞ | 0.00 | 0.00 | −0.00 |
| L2 | 6 | 19.24 | 7.01 | 0.37 | −4.82 |
| L3A | 12 | 36.35 | 1.80 | 1.21 | 0.22 |
| L3B | 14 | −19.36 | 1.10 | −0.13 | −0.75 |
| G | 16 | ∞ | 2.20 | 0.81 | −0.81 |

Single lens data

| Lens | Start surface | Focal length |
|---|---|---|
| 1 | 1 | −17.18 |
| 2 | 3 | 39.72 |
| 3 | 6 | 19.99 |
| 4 | 8 | −26.16 |
| 5 | 10 | 24.26 |
| 6 | 12 | 36.35 |
| 7 | 14 | −19.36 |
| 8 | 16 | 0.00 |
| 9 | 18 | 0.00 |

Numerical Example 2

Unit: mm

Surface data

| Surface number | r | d | nd | vd | Effective diameter |
|---|---|---|---|---|---|
| 1 | 335.246 | 2.00 | 1.85135 | 40.1 | 24.03 |
| 2* | 13.760 | 3.21 | | | 19.39 |
| 3 | 17.153 | 2.70 | 1.92286 | 20.9 | 19.32 |
| 4 | 28.292 | (variable) | | | 18.50 |
| 5(stop) | ∞ | (variable) | | | 9.68 |
| 6* | 10.457 | 3.50 | 1.58313 | 59.4 | 9.87 |
| 7 | 40.325 | 0.36 | | | 9.12 |
| 8 | 19.255 | 1.80 | 1.60311 | 60.6 | 8.90 |
| 9 | 228.119 | 0.93 | | | 8.38 |
| 10 | −19.704 | 1.10 | 1.84666 | 23.8 | 8.09 |
| 11 | 201.902 | 0.89 | | | 7.98 |
| 12 | 127.080 | 1.70 | 1.55332 | 71.7 | 7.89 |
| 13* | −24.283 | (variable) | | | 7.78 |
| 14 | −235.335 | 1.80 | 1.80518 | 25.4 | 13.58 |
| 15 | −32.191 | (variable) | | | 14.00 |
| 16 | −13.421 | 1.20 | 1.76802 | 49.2 | 14.23 |
| 17* | −54.777 | (variable) | | | 16.04 |
| 18 | ∞ | 1.20 | 1.51633 | 64.1 | 30.00 |
| 19 | ∞ | 0.50 | | | 30.00 |
| 20 | ∞ | 0.50 | 1.51633 | 64.1 | 30.00 |
| 21 | ∞ | | | | 30.00 |
| Image plane | ∞ | | | | |

Aspheric surface data

Second surface

K = −4.89598e−001 A4 = 2.05544e−005 A6 = 8.29112e−008
A8 = 1.96550e−010 A10 = 1.81500e−014

-continued

Unit: mm

Sixth surface

K = −6.81908e−001 A4 = 1.00935e−004 A6 = 1.41205e−006
A8 = −6.67307e−009 A10 = 5.14516e−010

Thirteenth surface

K = 0.00000e+000 A4 = 2.48890e−004 A6 = 1.52840e−006
A8 = 8.21576e−008

Seventeenth surface

K = 0.00000e+000 A4 = −1.29737e−005 A6 = −9.39646e−009
A8 = −7.15201e−010 A10 = 8.18626e−012

Various data
Zoom ratio: 2.86

| | Wide-angle | Middle | Telephoto |
|---|---|---|---|
| Focal length | 18.20 | 35.24 | 52.10 |
| F-number | 3.61 | 5.29 | 7.00 |
| Half angle of view (degree) | 36.77 | 21.10 | 14.63 |
| Image height | 13.60 | 13.60 | 13.60 |
| Total lens length | 65.15 | 60.50 | 65.96 |
| BF | 0.50 | 0.50 | 0.50 |
| d4 | 21.61 | 7.08 | 2.66 |
| d5 | −0.16 | −0.69 | −1.21 |
| d13 | 9.92 | 10.96 | 11.07 |
| d15 | 2.00 | 2.00 | 1.95 |
| d17 | 7.91 | 17.27 | 27.62 |
| Entrance pupil position | 14.37 | 9.02 | 6.57 |
| Exit pupil position | −24.11 | −33.72 | −43.87 |
| Front principal point position | 19.11 | 7.97 | −2.51 |
| Rear principal point position | −17.70 | −34.74 | −51.60 |

Zoom lens unit data

| Unit | Start surface | Focal length | Lens configuration length | Front principal point position | Rear principal point position |
|---|---|---|---|---|---|
| L1 | 1 | −29.59 | 7.91 | 0.27 | −5.34 |
| SP | 5 | ∞ | 0.00 | 0.00 | −0.00 |
| L2 | 6 | 19.48 | 10.27 | 0.41 | −7.28 |
| L3A | 14 | 46.13 | 1.80 | 1.15 | 0.16 |
| L3B | 16 | −23.44 | 1.20 | −0.22 | −0.91 |
| G | 18 | ∞ | 2.20 | 0.81 | −0.81 |

Single lens data

| Lens | Start surface | Focal length |
|---|---|---|
| 1 | 1 | −16.90 |
| 2 | 3 | 42.29 |
| 3 | 6 | 23.21 |
| 4 | 8 | 34.76 |
| 5 | 10 | −21.16 |
| 6 | 12 | 36.99 |
| 7 | 14 | 46.13 |
| 8 | 16 | −23.44 |
| 9 | 18 | 0.00 |
| 10 | 20 | 0.00 |

Numerical Example 3

Unit: mm

Surface data

| Surface number | r | d | nd | vd | Effective diameter |
|---|---|---|---|---|---|
| 1 | −941.504 | 2.10 | 1.85135 | 40.1 | 26.05 |
| 2* | 16.681 | 2.96 | | | 21.70 |
| 3 | 19.114 | 2.90 | 1.92286 | 20.9 | 21.84 |
| 4 | 32.192 | (variable) | | | 21.08 |
| 5* | 10.682 | 3.60 | 1.58313 | 59.4 | 9.39 |
| 6* | −358.259 | 0.36 | | | 8.88 |
| 7 | 25.252 | 1.60 | 1.48749 | 70.2 | 8.55 |
| 8 | 129.775 | 1.20 | 1.80809 | 22.8 | 8.05 |
| 9 | 16.420 | 1.18 | | | 7.53 |
| 10 | −55.945 | 1.50 | 1.55332 | 71.7 | 7.39 |
| 11* | −15.970 | 0.99 | | | 7.34 |
| 12(stop) | ∞ | (variable) | | | 6.96 |
| 13 | −22.687 | 1.80 | 1.80518 | 25.4 | 11.37 |
| 14 | −13.868 | 1.75 | | | 12.03 |
| 15 | −10.179 | 1.20 | 1.76802 | 49.2 | 12.32 |
| 16* | −35.476 | (variable) | | | 14.23 |
| 17 | ∞ | 1.20 | 1.51633 | 64.1 | 30.00 |
| 18 | ∞ | 0.50 | | | 30.00 |
| 19 | ∞ | 0.50 | 1.51633 | 64.1 | 30.00 |
| 20 | ∞ | | | | 30.00 |
| Image plane | ∞ | | | | |

Aspheric surface data

Second surface

K = 0.00000e+000 A4 = 2.85663e−006 A6 = −6.42586e−009
A8 = −1.34037e−011 A10 = −2.33517e−013

Fifth surface

K = 0.00000e+000 A4 = −6.78016e−005 A6 = −2.39198e−006
A8 = 9.66286e−009 A10 = −2.78029e−009

Sixth surface

K = 0.00000e+000 A4 = 6.44369e−007 A6 = −2.42536e−006
A8 = −1.35785e−007

Eleventh surface

K = 0.00000e+000 A4 = 1.37313e−004 A6 = 2.61315e−006
A8 = 9.51658e−008

Sixteenth surface

K = 0.00000e+000 A4 = −2.87189e−005 A6 = 1.45191e−008
A8 = −1.30367e−009 A10 = 4.13170e−012

Various data
Zoom ratio: 2.86

| | Wide-angle | Middle | Telephoto |
|---|---|---|---|
| Focal length | 18.20 | 35.31 | 52.10 |
| F-number | 3.61 | 5.31 | 7.00 |
| Half angle of view (degree) | 36.77 | 21.07 | 14.63 |
| Image height | 13.60 | 13.60 | 13.60 |
| Total lens length | 64.49 | 57.22 | 61.04 |
| BF | 0.50 | 0.50 | 0.50 |
| d4 | 23.20 | 6.40 | 0.70 |
| d12 | 7.94 | 7.60 | 7.29 |
| d16 | 7.51 | 17.37 | 27.21 |
| Entrance pupil position | 19.10 | 14.66 | 12.51 |
| Exit pupil position | −18.09 | −27.75 | −37.40 |
| Front principal point position | 19.49 | 5.84 | −7.01 |
| Rear principal point position | −17.70 | −34.81 | −51.60 |

-continued

Unit: mm

Zoom lens unit data

| Unit | Start surface | Focal length | Lens configuration length | Front principal point position | Rear principal point position |
|---|---|---|---|---|---|
| L1 | 1 | −34.28 | 7.96 | 0.38 | −5.12 |
| L2 | 5 | 18.37 | 10.43 | 0.60 | −7.38 |
| L3A | 13 | 40.61 | 1.80 | 2.35 | 1.44 |
| L3B | 15 | −18.98 | 1.20 | −0.28 | −0.97 |
| G | 17 | ∞ | 2.20 | 0.81 | −0.81 |

Single lens data

| Lens | Start surface | Focal length |
|---|---|---|
| 1 | 1 | −19.23 |
| 2 | 3 | 46.08 |
| 3 | 5 | 17.85 |
| 4 | 7 | 63.99 |
| 5 | 8 | −23.37 |
| 6 | 10 | 39.86 |
| 7 | 13 | 40.61 |
| 8 | 15 | −18.98 |
| 9 | 17 | 0.00 |
| 10 | 19 | 0.00 |

Numerical Example 4

Unit: mm

Surface data

| Surface number | r | d | nd | vd | Effective diameter |
|---|---|---|---|---|---|
| 1 | 474.910 | 2.00 | 1.88202 | 37.2 | 26.10 |
| 2* | 14.420 | 2.55 | | | 21.00 |
| 3 | 17.336 | 3.00 | 1.92286 | 20.9 | 21.19 |
| 4 | 32.217 | (variable) | | | 20.51 |
| 5(stop) | ∞ | (variable) | | | 9.65 |
| 6* | 10.510 | 3.00 | 1.69350 | 53.2 | 10.08 |
| 7 | 28.553 | 0.22 | | | 9.31 |
| 8 | 14.847 | 2.90 | 1.55332 | 71.7 | 9.09 |
| 9 | −22.268 | 0.70 | 1.76182 | 26.5 | 8.32 |
| 10 | 30.733 | 0.87 | | | 7.88 |
| 11 | −86.184 | 0.90 | 1.74330 | 49.3 | 7.67 |
| 12* | −1723.710 | (variable) | | | 7.49 |
| 13 | 452.220 | 2.00 | 1.80518 | 25.4 | 13.03 |
| 14 | −36.074 | (variable) | | | 13.56 |
| 15 | −14.559 | 0.90 | 1.80400 | 46.6 | 14.20 |
| 16 | −40.088 | (variable) | | | 15.62 |
| 17 | ∞ | 1.20 | 1.51633 | 64.1 | 30.00 |
| 18 | ∞ | 0.50 | | | 30.00 |
| 19 | ∞ | 0.50 | 1.51633 | 64.1 | 30.00 |
| 20 | ∞ | | | | 30.00 |
| Image plane | ∞ | | | | |

Aspheric surface data

Second surface

K = 0.00000e+000 A4 = 9.36719e−007 A6 = −3.21408e−008
A8 = 1.76026e−010 A10 = −2.59875e−012

Sixth surface

K = 0.00000e+000 A4 = 4.22453e−005 A6 = 4.59342e−007
A8 = 1.33646e−008

Twelfth surface

K = 0.00000e+000 A4 = 3.16055e−004 A6 = 2.64693e−006
A8 = 1.15951e−007

Various data
Zoom ratio: 2.86

| | Wide-angle | Middle | Telephoto |
|---|---|---|---|
| Focal length | 18.20 | 35.16 | 52.10 |
| F-number | 3.61 | 5.15 | 6.70 |
| Half angle of view (degree) | 36.77 | 21.15 | 14.63 |
| Image height | 13.60 | 13.60 | 13.60 |
| Total lens length | 68.25 | 61.04 | 65.15 |
| BF | 0.50 | 0.50 | 0.50 |
| d4 | 24.56 | 7.98 | 2.71 |
| d5 | 1.46 | 0.69 | −0.07 |
| d12 | 9.07 | 8.42 | 8.10 |
| d14 | 2.73 | 3.08 | 3.26 |
| d16 | 8.70 | 19.13 | 29.42 |
| Entrance pupil position | 15.73 | 9.47 | 6.40 |
| Exit pupil position | −25.66 | −35.33 | −45.05 |
| Front principal point position | 21.27 | 10.13 | −1.10 |
| Rear principal point position | −17.70 | −34.66 | −51.60 |

Zoom lens unit data

| Unit | Start surface | Focal length | Lens configuration length | Front principal point position | Rear principal point position |
|---|---|---|---|---|---|
| L1 | 1 | −32.41 | 7.55 | 0.35 | −4.72 |
| SP | 5 | ∞ | 0.00 | 0.00 | −0.00 |
| L2 | 6 | 21.06 | 8.58 | −3.17 | −7.76 |
| L3A | 13 | 41.57 | 2.00 | 1.03 | −0.08 |
| L3B | 15 | −28.89 | 0.90 | −0.29 | −0.80 |
| G | 17 | ∞ | 2.20 | 0.81 | −0.81 |

Single lens data

| Lens | Start surface | Focal length |
|---|---|---|
| 1 | 1 | −16.90 |
| 2 | 3 | 37.08 |
| 3 | 6 | 22.46 |
| 4 | 8 | 16.56 |
| 5 | 9 | −16.85 |
| 6 | 11 | −122.08 |
| 7 | 13 | 41.57 |
| 8 | 15 | −28.89 |
| 9 | 17 | 0.00 |
| 10 | 19 | 0.00 |

Numerical Example 5

Unit: mm

Surface data

| Surface number | r | d | nd | vd | Effective diameter |
|---|---|---|---|---|---|
| 1 | 209.292 | 0.70 | 1.88300 | 40.8 | 25.33 |
| 2 | 15.755 | 0.27 | | | 21.60 |
| 3 | 15.900 | 1.74 | 1.53110 | 56.0 | 21.60 |
| 4* | 15.473 | 2.93 | | | 20.67 |
| 5 | 17.356 | 2.60 | 1.92286 | 20.9 | 20.66 |
| 6 | 26.517 | (variable) | | | 19.90 |

-continued

Unit: mm

| 7(stop) | ∞ | (variable) | | | 9.59 |
|---|---|---|---|---|---|
| 8* | 10.078 | 3.00 | 1.69350 | 53.2 | 10.15 |
| 9 | 41.379 | 0.49 | | | 9.40 |
| 10 | 19.773 | 2.60 | 1.55332 | 71.7 | 9.01 |
| 11 | −20.609 | 0.70 | 1.76182 | 26.5 | 8.17 |
| 12 | 31.011 | 0.64 | | | 7.65 |
| 13 | −96.706 | 0.90 | 1.76802 | 49.2 | 7.50 |
| 14* | 1103.906 | (variable) | | | 7.31 |
| 15 | 901.149 | 2.10 | 1.80518 | 25.4 | 13.94 |
| 16 | −36.521 | 2.36 | | | 14.42 |
| 17 | −14.400 | 0.90 | 1.80400 | 46.6 | 14.76 |
| 18 | −38.550 | (variable) | | | 16.19 |
| 19 | ∞ | 1.20 | 1.51633 | 64.1 | 30.00 |
| 20 | ∞ | 0.50 | | | 30.00 |
| 21 | ∞ | 0.50 | 1.51633 | 64.1 | 30.00 |
| 22 | ∞ | | | | 30.00 |
| Image plane | ∞ | | | | |

Aspheric surface data

Fourth surface

K = 0.00000e+000 A4 = 5.50689e−006 A6 = 4.97218e−008
A8 = −4.36623e−010 A10 = 1.27517e−012

Eighth surface

K = 0.00000e+000 A4 = 3.85936e−005 A6 = 2.90621e−007
A8 = 1.75936e−008

Fourteenth surface

K = 0.00000e+000 A4 = 3.14991e−004 A6 = 2.32339e−006
A8 = 1.57121e−007

Various data
Zoom ratio: 2.86

| | Wide-angle | Middle | Telephoto |
|---|---|---|---|
| Focal length | 18.20 | 35.22 | 52.10 |
| F-number | 3.61 | 5.31 | 7.00 |
| Half angle of view (degree) | 36.77 | 21.11 | 14.63 |
| Image height | 13.60 | 13.60 | 13.60 |
| Total lens length | 68.09 | 61.94 | 66.66 |
| BF | 0.50 | 0.50 | 0.50 |
| d6 | 23.01 | 7.71 | 3.28 |
| d7 | 2.25 | 0.85 | −0.56 |
| d14 | 10.36 | 9.43 | 8.98 |
| d18 | 7.83 | 19.32 | 30.33 |
| Entrance pupil position | 15.43 | 9.71 | 7.26 |
| Exit pupil position | −25.78 | −35.88 | −45.87 |
| Front principal point position | 21.03 | 10.83 | 0.83 |
| Rear principal point position | −17.70 | −34.72 | −51.60 |

Zoom lens unit data

| Unit | Start surface | Focal length | Lens configuration length | Front principal point position | Rear principal point position |
|---|---|---|---|---|---|
| L1 | 1 | −32.19 | 8.24 | 0.27 | −5.65 |
| SP | 7 | ∞ | 0.00 | 0.00 | −0.00 |
| L2 | 8 | 20.86 | 8.33 | −3.22 | −7.63 |
| L3A | 15 | 43.63 | 2.10 | 1.12 | −0.05 |
| L3B | 17 | −29.07 | 0.90 | −0.30 | −0.81 |
| G | 19 | ∞ | 2.20 | 0.81 | −0.81 |

Single lens data

| Lens | Start surface | Focal length |
|---|---|---|
| 1 | 1 | −19.33 |
| 2 | 3 | 2598.22 |
| 3 | 5 | 47.91 |
| 4 | 8 | 18.49 |
| 5 | 10 | 18.67 |
| 6 | 11 | −16.16 |
| 7 | 13 | −115.74 |
| 8 | 15 | 43.63 |
| 9 | 17 | −29.07 |
| 10 | 19 | 0.00 |
| 11 | 21 | 0.00 |

Numerical Example 6

Unit: mm

Surface data

| Surface number | r | d | nd | vd | Effective diameter |
|---|---|---|---|---|---|
| 1 | 285.744 | 0.70 | 1.83400 | 37.2 | 22.75 |
| 2 | 18.420 | 4.20 | | | 19.94 |
| 3 | −102.878 | 0.70 | 1.76802 | 49.2 | 19.56 |
| 4* | 111.133 | 0.12 | | | 19.24 |
| 5 | 20.593 | 2.20 | 1.92286 | 20.9 | 19.15 |
| 6 | 38.116 | (variable) | | | 18.65 |
| 7(stop) | ∞ | (variable) | | | 9.59 |
| 8* | 9.854 | 3.10 | 1.69350 | 53.2 | 10.07 |
| 9 | 40.931 | 0.46 | | | 9.30 |
| 10 | 16.372 | 3.00 | 1.55332 | 71.7 | 8.88 |
| 11 | −18.056 | 0.70 | 1.78472 | 25.7 | 7.94 |
| 12 | 49.252 | 0.58 | | | 7.50 |
| 13 | −45.968 | 0.90 | 1.76802 | 49.2 | 7.36 |
| 14* | 145.258 | (variable) | | | 7.12 |
| 15 | −542.068 | 1.50 | 1.84666 | 23.8 | 13.45 |
| 16 | −37.397 | (variable) | | | 13.81 |
| 17 | −12.055 | 0.90 | 1.80400 | 46.6 | 14.27 |
| 18 | −25.100 | (variable) | | | 15.92 |
| 19 | ∞ | 1.20 | 1.51633 | 64.1 | 30.00 |
| 20 | ∞ | 0.50 | | | 30.00 |
| 21 | ∞ | 0.50 | 1.51633 | 64.1 | 30.00 |
| 22 | ∞ | | | | 30.00 |
| Image plane | ∞ | | | | |

Aspheric surface data

Fourth surface

K = 0.00000e+000 A4 = 2.00154e−005 A6 = −1.02309e−008
A8 = 5.62424e−010 A10 = −1.20907e−012

Eighth surface

K = 0.00000e+000 A4 = 4.40958e−005 A6 = 8.31775e−008
A8 = 1.95210e−008

Fourteenth surface

K = 0.00000e+000 A4 = 3.80991e−004 A6 = 1.53930e−006
A8 = 2.47609e−007

Various data
Zoom ratio: 2.86

| | Wide-angle | Middle | Telephoto |
|---|---|---|---|
| Focal length | 18.20 | 35.33 | 52.10 |
| F-number | 3.61 | 5.31 | 7.00 |
| Half angle of view (degree) | 36.77 | 21.05 | 14.63 |
| Image height | 13.60 | 13.60 | 13.60 |
| Total lens length | 62.20 | 58.14 | 63.67 |
| BF | 0.50 | 0.50 | 0.50 |
| d6 | 19.67 | 5.92 | 1.77 |
| d7 | 1.31 | 0.64 | −0.03 |
| d14 | 9.31 | 6.78 | 6.09 |
| d16 | 2.78 | 3.81 | 4.05 |

-continued

Unit: mm

| | | | |
|---|---|---|---|
| d18 | 7.36 | 19.22 | 30.02 |
| Entrance pupil position | 13.69 | 8.56 | 6.26 |
| Exit pupil position | −23.95 | −34.16 | −44.29 |
| Front principal point position | 18.34 | 7.88 | −2.24 |
| Rear principal point position | −17.70 | −34.83 | −51.60 |

Zoom lens unit data

| Unit | Start surface | Focal length | Lens configuration length | Front principal point position | Rear principal point position |
|---|---|---|---|---|---|
| L1 | 1 | −28.81 | 7.92 | 0.10 | −6.05 |
| SP | 7 | ∞ | 0.00 | 0.00 | −0.00 |
| L2 | 8 | 19.36 | 8.74 | −3.78 | −7.98 |
| L3A | 15 | 47.38 | 1.50 | 0.87 | 0.06 |
| L3B | 17 | −29.76 | 0.90 | −0.48 | −0.99 |
| G | 19 | ∞ | 2.20 | 0.81 | −0.81 |

Single lens data

| Lens | Start surface | Focal length |
|---|---|---|
| 1 | 1 | −23.64 |
| 2 | 3 | −69.46 |
| 3 | 5 | 45.78 |
| 4 | 8 | 17.98 |
| 5 | 10 | 16.02 |
| 6 | 11 | −16.76 |
| 7 | 13 | −45.37 |
| 8 | 15 | 47.38 |
| 9 | 17 | −29.76 |
| 10 | 19 | 0.00 |
| 11 | 21 | 0.00 |

TABLE 1

| Condition | Lower limit | Upper limit | Numerical Examples | | | | | |
|---|---|---|---|---|---|---|---|---|
| | | | 1 | 2 | 3 | 4 | 5 | 6 |
| (1) | 1.05 | 3.00 | 1.438 | 1.649 | 1.805 | 2.141 | 2.193 | 2.848 |
| (2) | 1.00 | 2.50 | 1.878 | 1.968 | 2.14 | 1.439 | 1.501 | 1.592 |
| (3) | 0.85 | 1.20 | 1 | 0.997 | 1 | 1.026 | 1 | 1.056 |
| (4) | 3.00 | 6.50 | 4.688 | 4.79 | 4.742 | 5.018 | 5.007 | 4.574 |

Next, an exemplary embodiment in which a digital still camera is used as an example of the image pickup apparatus according to the exemplary embodiments of the present invention will be described with reference to FIG. 19. FIG. 19 illustrates a camera body 20 and a photographic optical system 21, which includes the zoom lens according to an exemplary embodiment of the present invention. A solid-state image sensor (photoelectric conversion element) 22 such as a CCD sensor or a CMOS sensor is incorporated in the camera body 20 and configured to receive an object image formed by the photographic optical system 21.

A memory 23 records information corresponding to the object image which has been photoelectrically converted by the solid-state image sensor 22. A viewfinder 24, which includes a liquid crystal display panel or the like, is for observing the object image formed on the solid-state image sensor 22. As described above, according to the exemplary embodiments of the present invention, a compact image pickup apparatus with high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153686 filed Jul. 9, 2012, which is hereby incorporated by reference herein in its entirety.

What is claimed is:

1. A zoom lens consisting of, in order from an object side to an image side:

a first lens unit having negative refractive power;

a second lens unit having positive refractive power; and a third lens unit having negative refractive power, wherein the first lens unit and the second lens unit move during zooming to make a distance between the first lens unit and the second lens unit smaller at a telephoto end than at a wide-angle end, wherein the third lens unit consists of, in order from the object side to the image side, a first lens subunit having positive refractive power and a second lens subunit having negative refractive power, and wherein the first lens subunit is fixed during focusing, and wherein the second lens subunit moves toward the image side during focusing from an infinite-distance object to a near-distance object.

2. The zoom lens according to claim 1, wherein, when a radius of curvature of an air-contact surface on the object side of a single lens having negative refractive power or a cemented lens having negative refractive power which has the smallest absolute value of a focal length of the second lens subunit is R3Ba, and a radius of curvature of an air-contact surface on the image side of the single lens having negative refractive power or the cemented lens having negative refractive power which has the smallest absolute value of the focal length of the second lens subunit is R3Bb, a condition below is satisfied:

$$1.05 < (R3Bb + R3Ba)/(R3Bb − R3Ba) < 3.00.$$

3. The zoom lens according to claim 1, wherein the second lens subunit includes a single lens or a single cemented lens.

4. The zoom lens according to claim 1, wherein the second lens subunit moves toward the object side with a movement locus different from, or with the same locus as, a movement locus of the first lens subunit during zooming from the wide-angle end to the telephoto end.

5. The zoom lens according to claim 1, wherein, when a focal length of the first lens subunit is f3A and the focal length of the second lens subunit is f3B, a condition below is satisfied:

$$1.0 < f3A/|f3B| < 2.5.$$

6. The zoom lens according to claim 1, wherein, when an amount of movement of the first lens subunit during zooming from the wide-angle end to the telephoto end is x3A and an amount of movement of the second lens subunit during zooming from the wide-angle end to the telephoto end is x3B, a condition below is satisfied:

$$0.85 < x3A/x3B < 1.20.$$

7. The zoom lens according to claim 1, wherein the first lens unit includes three or less lenses in total including, in order from the object side to the image side, at least one each of a lens having negative refractive power or a cemented lens having negative refractive power, and a lens having positive refractive power or a cemented lens having positive refractive power.

8. An image pickup apparatus comprising:
a zoom lens; and
an image sensor configured to receive an image formed by the zoom lens,
wherein the zoom lens consists of, in order from an object side to an image side, a first lens unit having negative refractive power, a second lens unit having positive refractive power, and a third lens unit having negative refractive power,
wherein the first lens unit and the second lens unit move during zooming to make a distance between the first lens unit and the second lens unit smaller at a telephoto end than at a wide-angle end,
wherein the third lens unit consists of, in order from the object side to the image side, a first lens subunit having positive refractive power and a second lens subunit having negative refractive power,
wherein the first lens subunit is fixed during focusing, and
wherein the second lens subunit moves toward the image side during focusing from an infinite-distance object to a near-distance object.

9. The image pickup apparatus according to claim 8, wherein, when a distance on an optical axis from a lens surface nearest to the object side to an image plane at the telephoto end is TLt, a focal length of the entire zoom lens at the telephoto end is ft, and a photographing half angle of view at the telephoto end is $\omega t$ (degrees), a condition below is satisfied:

$$3.0 < TLt/(ft*\tan(\omega t)) < 6.5.$$

* * * * *